United States Patent
Killian et al.

(10) Patent No.: US 9,740,791 B1
(45) Date of Patent: Aug. 22, 2017

(54) BROWSER AS A SERVICE

(71) Applicant: Amazon Technologies, Inc., Seattle, WA (US)

(72) Inventors: David Andrew Killian, Seattle, WA (US); Dhruva Lakshmana Rao Batni, Seattle, WA (US); Rohit Krishna Kumar, Seattle, WA (US); Nikhil Dinkar Joshi, Seattle, WA (US); Samuel John Young, Seattle, WA (US); Saral Jain, Bellevue, WA (US); James Alan Umstot, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 236 days.

(21) Appl. No.: 14/494,446

(22) Filed: Sep. 23, 2014

(51) Int. Cl.
*G06F 17/00* (2006.01)
*G06F 17/30* (2006.01)
*G06F 17/22* (2006.01)

(52) U.S. Cl.
CPC .... *G06F 17/30893* (2013.01); *G06F 17/2247* (2013.01)

(58) Field of Classification Search
CPC .................................................. G06F 17/2247
See application file for complete search history.

(56) References Cited

U.S. PATENT DOCUMENTS

| | | |
|---|---|---|
| 8,775,923 B1 | 7/2014 | Kroeger |
| 2007/0180364 A1 | 8/2007 | Kobayashi |
| 2008/0139191 A1 | 6/2008 | Melnyk |
| 2008/0295164 A1* | 11/2008 | Steiner ............... H04L 63/10 726/14 |
| 2009/0292984 A1 | 11/2009 | Bauchot |
| 2010/0005410 A1* | 1/2010 | Pang ................... G06F 9/455 715/765 |
| 2010/0146112 A1 | 6/2010 | Shacham |
| 2010/0262780 A1 | 10/2010 | Mahan |
| 2010/0306643 A1 | 12/2010 | Chabot |
| 2010/0313149 A1 | 12/2010 | Zhang |
| 2011/0055699 A1 | 3/2011 | Li |
| 2011/0066732 A1 | 3/2011 | Iwade |
| 2011/0066733 A1 | 3/2011 | Hashimoto |

(Continued)

OTHER PUBLICATIONS

Wikipedia, "Document Object Model," <http://en.wikipedia.org/wiki/Document_object_model>, 5 pages (accessed Jul. 29, 2014).

*Primary Examiner* — Keith Bloomquist
(74) *Attorney, Agent, or Firm* — Klarquist Sparkman, LLP

(57) ABSTRACT

Techniques and solutions for providing a cloud browse service are described. For example, a client can request a web page. In response to the request, the client can receive a processed layer tree representing the web page. The processed layer tree can be created by a server environment (e.g., by creating an original DOM from obtained HTML and associated web page resources for the web page and creating the processed layers from the original DOM). The client can create a simplified DOM from the received processed layers and display the web page using the simplified DOM. Techniques and solutions for providing a browser as a service are described. For example, a web browser component can receive a processed layer tree representing a web page, create a simplified DOM, and display the web page.

20 Claims, 21 Drawing Sheets

(56) References Cited

U.S. PATENT DOCUMENTS

| | | | |
|---|---|---|---|
| 2011/0219386 A1* | 9/2011 | Hwang | G06F 17/30852 |
| | | | 719/328 |
| 2011/0289393 A1 | 11/2011 | Choi | |
| 2012/0260157 A1 | 10/2012 | Zhu | |
| 2013/0024759 A1* | 1/2013 | Yuan | G06F 17/30902 |
| | | | 715/205 |
| 2013/0179774 A1 | 7/2013 | Wang | |
| 2014/0012685 A1* | 1/2014 | Le Chevalier | G06Q 30/02 |
| | | | 705/14.73 |
| 2015/0193401 A1 | 7/2015 | Kim | |
| 2015/0339268 A1* | 11/2015 | Bednarz, Jr. | H04L 67/02 |
| | | | 715/248 |
| 2016/0026611 A1 | 1/2016 | Liu | |

* cited by examiner

BROWSER AS A SERVICE

BACKGROUND

Generally described, computing devices and communication networks can be utilized to exchange information. In a common application, a computing device can request content from another computing device via the communication network. For example, a user at a personal computing device can utilize a software browser application, typically referred to as a browser software application, to request a Web page from a server computing device via the Internet. In such embodiments, the user computing device can be referred to as a client computing device and the server computing device can be referred to as a content provider.

With reference to an illustrative example, a requested Web page, or original content, may be associated with a number of additional resources, such as images or videos, that are to be displayed with the Web page. In one specific embodiment, the additional resources of the Web page are identified by a number of embedded resource identifiers, such as uniform resource locators ("URLs"). In turn, software on the client computing devices, such as a browser software application, typically processes embedded resource identifiers to generate requests for the content. Accordingly, in order to satisfy a content request, one or more content providers will generally provide client computing devices data associated with the Web page as well as the data associated with the embedded resources.

From the perspective of a user utilizing a client computing device, a user experience can be defined in terms of the performance and latencies associated with obtaining network content over a communication network, such as obtaining a Web page, processing embedded resource identifiers, generating requests to obtain embedded resources, rendering content on the client computing device, and interacting with the rendered content on the client computing device. Latencies and performance limitations of any of the above processes may diminish the user experience. Additionally, latencies and inefficiencies may be especially apparent on computing devices with limited resources, such as processing power, memory or network connectivity such as netbooks, tablets, smartphones, and the like.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings.

DETAILED DESCRIPTION

Figure 1:
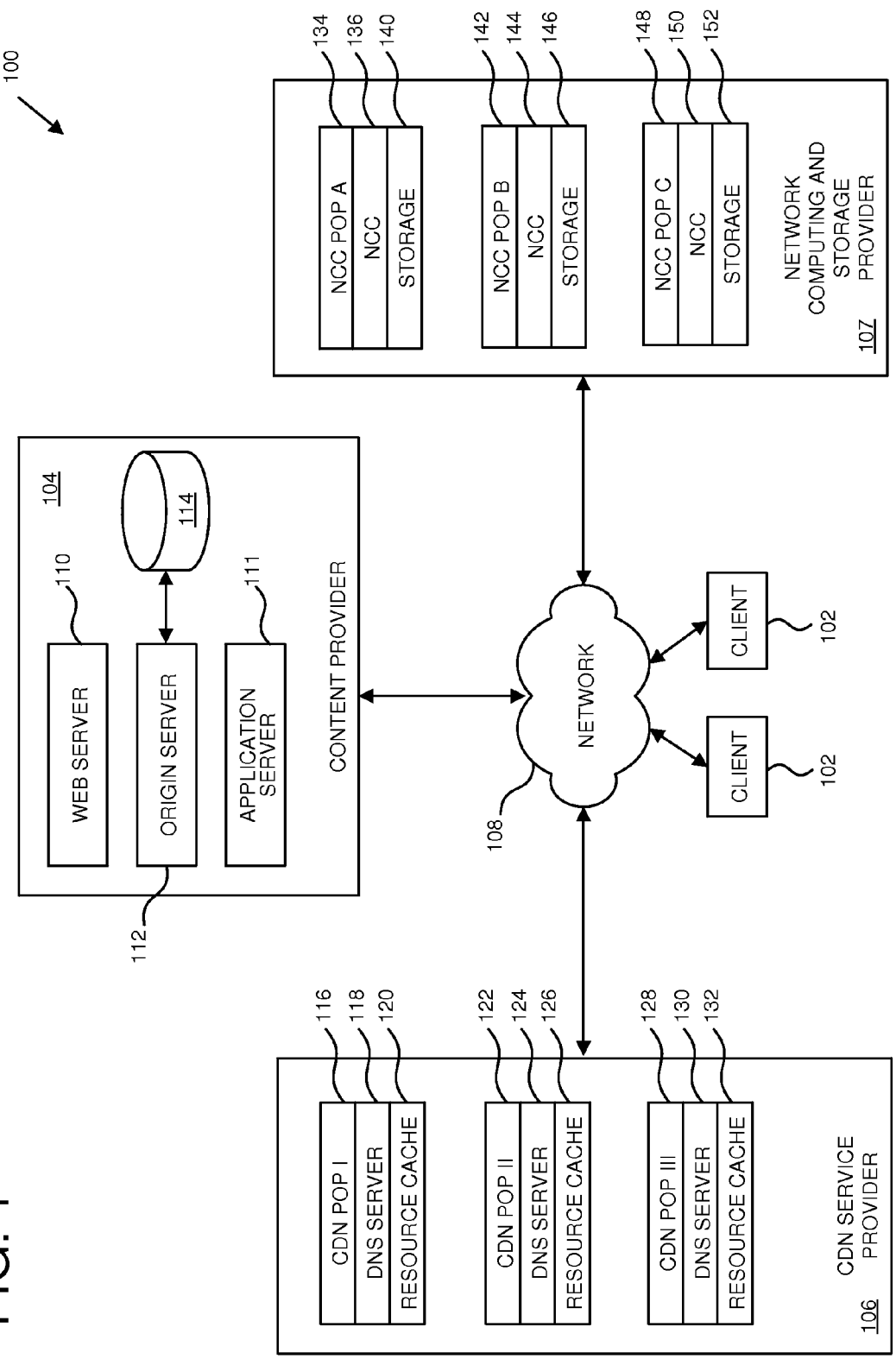
FIG. 1 is a block diagram illustrative of a content delivery environment including a number of client computing devices, content provider, a content delivery network service provider, and a network computing and storage provider.

The following description is directed to techniques and solutions for providing a cloud browse service. For example, a client (e.g., a web browser, also called a web browser application, running on a client device) can request a web page. In response to the request, the client can receive a processed layer tree (e.g., a composited layer tree) representing the web page. The processed layer tree can be created by a server environment (e.g., by creating an original DOM from obtained HTML and associated web page resources for the web page and creating the processed layers from the original DOM). The client can create a simplified DOM from the received processed layers (e.g., with a DOM node of the simplified DOM created for each of the processed layers). The client can display the web page using the simplified DOM.

The following description is also directed to techniques and solutions for providing a browser as a service. For example, a browser component (e.g., a web browser plug-in, a browser extension component, custom browser code, JavaScript code from a loaded web page, etc.) can receive processed layers (e.g., as a processed layer tree) for a requested web page, create a simplified DOM from the processed layers, and/or display the requested web page using the simplified DOM Generally described, some aspects of the present disclosure are directed to the generation and management of a remote application session between client computing devices and content providers in conjunction with a network computing and storage provider. Specifically, some aspects of the disclosure will be described with regard to the request for a browse session by a client computing device with a content provider, the establishment of a remote browse session between the client computing device and a network computing and storage provider, and the transmission of browse session state data and client interaction data between the client computing device and the network computing and storage provider. Although some aspects of the embodiments described in the disclosure will focus, for the purpose of illustration, on the management of a remote browse session, one skilled in the art will appreciate that the techniques disclosed herein may be applied to any number of software processes or applications. Further, although various aspects of the disclosure will be described with regard to illustrative examples and embodiments, one skilled in the art will appreciate that the disclosed embodiments and examples should not be construed as limiting.

With reference to an illustrative example, a user may cause a client computing device to load a software browser application (henceforth referred to as a "browser") for accessing content provided by one or more content providers. Illustratively, the accessed content may include a collection of one or more network resources (e.g., a Web page) and embedded resources such as images, video, audio, text, executable code, and other resources. In one embodiment, the browser may have a content display area or pane for displaying the accessed network content in addition to one or more local interface components, such as toolbars, menus, buttons, or other user interface controls. Local interface components may be managed and controlled by the software browser application or any other process executing or implemented locally at the client computing device. Illustratively, managing user interface controls locally may allow for a responsive user interface, as interactions by the user are processed locally on the client computing device.

Subsequent to the browser being loaded, a user or automated browser process may cause the client computing device to transmit a request to access content from a content provider by establishing a browse session with a network computing and storage provider across a private or public network. The browse session request may include information identifying one or more sources for the requested content. The identifiers can be in the form of network addresses of network resources, such as a Web site or other network accessible piece of content. For example, the user may select or enter a URL, (e.g., http://www.xyzwebsite.com) into a browser window, causing the client computing device to transmit a request for a new browse session to the network computing and storage provider, including the selected URL. The address or location of a network computing and storage provider capable to service the browse session request may be hardcoded into the browser, may be configurable by the user, may be obtained from a network address service, or may be determined in any other way.

In an illustrative embodiment, responsive to the browse session request received from the client computing device, the network computing and storage provider may instantiate or cause to have instantiated one or more computing components associated with the network computing and storage provider that will host a browser software application. For example, the network computing and storage provider can instantiate, or cause to have instantiated, an instance of a virtual machine that includes a software browser application capable of requesting resources from a communication network. Illustratively, in some situations, one or more devices associated with the network computing and storage provider may be located in a data center or other robustly networked computing environment, and, as compared to the client computing device, may experience relatively little latency or delay when obtaining network resources.

Using the instantiated network computing components, the network computing and storage provider may request the identified network resource(s) from one or more content providers, a content delivery network, or a local or associated cache component. For example, the browser software application on the instantiated network computing component can process a primary network resource and then generate additional content requests for content identified in one or more embedded resource identifiers (e.g. pictures, video files, etc.). Illustratively, in the case of other, non-browser, applications, network resources, or content may include any file type or format known in the art and supported by the specific software application.

Having obtained the requested content (e.g., the requested network resource and embedded resources), the network computing and storage provider may identify a remote session browsing configuration specifying a remote session communication protocol for use in transmitting the requested content, user interaction data, intermediate processing results, and other information between the browser being executed on the client computing device and the browser being executed at the instantiated network computing component on the computing and storage provider. The information exchanged between the browser on the instantiated network computing component and the browser on the client computing device can be generally referred to as "browser session information."

In addition to specifying a remote session communication protocol for transmitting information between the client computing device and the instantiated network computing component, in one embodiment, the identified remote session browsing configuration may specify that one or more processing actions to be performed on the requested content are to be performed at the network computing and storage provider rather than, or in addition to, at the client computing device For purposes of illustration, the processing of network content by a browser may involve various processing actions before content can be rendered in an appropriate form on a client computing device. A Web page, for example, may be parsed and processed to process various HTML layout information and references to associated resources or embedded content such as CSS style sheets and Javascript, as well as embedded content objects such as images, video, audio, etc. Each object or piece of code may be parsed and processed before a representative object model corresponding to the web page may be constructed and processed further for layout and display. In accordance with the selected remote session browsing configuration, the client computing device and the instantiated network computing component may exchange processing results via browser session information (e.g., state data or display data representing the requested content).

FIG. 1 is a block diagram illustrative of a networked computing environment 100 for the management and processing of content requests. As illustrated in FIG. 1, the networked computing environment 100 includes a number of client computing devices 102 (generally referred to as clients) for requesting content and content processing from a content provider 104, CDN service provider 106, or network computing and storage provider 107. In an illustrative embodiment, the client computing devices 102 can corresponds to a wide variety of computing devices including personal computing devices, laptop computing devices, hand-held computing devices, terminal computing devices, mobile devices (e.g., mobile phones, tablet computing devices, etc.), wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet. The client computing devices 102 may have varied local computing resources such as central processing units and architectures, memory, mass storage, graphics processing units, communication network availability and bandwidth, etc.

The networked computing environment 100 can also include a content provider 104 in communication with the one or more client computing devices 102 or other service providers (e.g., CDN service provider 106, network computing and storage provider 107, etc.) via the communication network 108. The content provider 104 illustrated in FIG. 1 corresponds to a logical association of one or more computing devices associated with a content provider. Specifically, the content provider 104 can include a web server component 110 corresponding to one or more server computing devices for obtaining and processing requests for content (such as Web pages) from the client computing devices 102 or other service providers. The content provider 104 can further include an origin server component 112 and associated storage component 114 corresponding to one or more computing devices for obtaining and processing requests for network resources from the CDN service provider. The content provider 104 can still further include an application server computing device 111, such as a data streaming server, for processing streaming content requests. One skilled in the relevant art will appreciate that the content provider 104 can be associated with various additional computing resources, such as additional computing devices for administration of content and resources, DNS name servers, and the like. For example, although not illustrated in FIG. 1, the content provider 104 can be associated with one or more DNS name server components that would be authoritative to resolve client computing device DNS queries corresponding to a domain of the content provider.

With continued reference to FIG. 1, the networked computing environment 100 can further include a CDN service provider 106 in communication with the one or more client computing devices 102 and other service providers via the communication network 108. The CDN service provider 106 illustrated in FIG. 1 corresponds to a logical association of one or more computing devices associated with a CDN service provider. Specifically, the CDN service provider 106 can include a number of Point of Presence ("POP") locations 116, 122, 128 that correspond to nodes on the communication network 108. Each CDN POP 116, 122, 128 includes a DNS component 118, 124, 130 made up of a number of DNS server computing devices for resolving DNS queries from the client computers 102. Each CDN POP 116, 122, 128 also includes a resource cache component 120, 126, 132 made up of a number of cache server computing devices for storing resources from content providers and transmitting various requested resources to various client computers. The DNS components 118, 124, and 130 and the resource cache components 120, 126, 132 may further include additional software and/or hardware components that facilitate communications including, but not limited to, load balancing or load sharing software/hardware components.

In an illustrative embodiment, the DNS component 118, 124, 130 and resource cache component 120, 126, 132 are considered to be logically grouped, regardless of whether the components, or portions of the components, are physically separate. Additionally, although the CDN POPs 116, 122, 128 are illustrated in FIG. 1 as logically associated with the CDN service provider 106, the CDN POPs will be geographically distributed throughout the communication network 108 in a manner to best serve various demographics of client computing devices 102. Additionally, one skilled in the relevant art will appreciate that the CDN service provider 106 can be associated with various additional computing resources, such as additional computing devices for administration of content and resources, and the like.

With further continued reference to FIG. 1, the networked computing environment 100 can also include a network computing and storage provider 107 in communication with the one or more client computing devices 102, the CDN service provider 106, and the content provider 104 via the communication network 108. The network computing and storage provider 107 illustrated in FIG. 1 also corresponds to a logical association of one or more computing devices associated with a network computing and storage provider. Specifically, the network computing and storage provider 107 can include a number of Point of Presence ("POP") locations 134, 142, 148 that correspond to nodes on the communication network 108. Each POP 134, 142, 148 includes a network computing component (NCC) 136, 144, 150 for hosting applications, such as data streaming applications, via a number of instances of a virtual machine, generally referred to as an instance of an NCC. One skilled in the relevant art will appreciate that NCC 136, 144, 150 would include physical computing device resources and software to provide the multiple instances of a virtual machine or to dynamically cause the creation of instances of a virtual machine. Such creation can be based on a specific request, such as from a client computing device, or the NCC can initiate dynamic creation of an instance of a virtual machine on its own. Each NCC POP 134, 142, 148 also includes a storage component 140, 146, 152 made up of a number of storage devices for storing any type of data used in the delivery and processing of network or computing resources, including but not limited to user data, state information, processing requirements, historical usage data, and resources from content providers that will be processed by an instance of an NCC 136, 144, 150 and transmitted to various client computers, etc. The NCCs 136, 144, 150 and the storage components 140, 146, 152 may further include additional software and/or hardware components that facilitate communications including, but not limited to, load balancing or load sharing software/hardware components for selecting instances of a virtual machine supporting a requested application and/or providing information to a DNS nameserver to facilitate request routing.

In an illustrative embodiment, NCCs 136, 144, 150 and the storage components 140, 146, 152 are considered to be logically grouped, regardless of whether the components, or portions of the components, are physically separate. For example, a network computing and storage provider 107 may maintain separate POPs for providing the NCC and the storage components. Additionally, although the NCC POPs 134, 142, 148 are illustrated in FIG. 1 as logically associated with a network computing and storage provider 107, the NCC POPs will be geographically distributed throughout the communication network 108 in a manner to best serve various demographics of client computing devices 102. Additionally, one skilled in the relevant art will appreciate that the network computing and storage provider 107 can be associated with various additional computing resources, such additional computing devices for administration of content and resources, and the like. Even further, one skilled in the relevant art will appreciate that the components of the network computing and storage provider 107 and components of the CDN service provider 106 can be managed by the same or different entities.

With reference to FIGS. 2-11, the generation and processing of network content in the context of a remote browse session instantiated at a network computing provider 107 will be described. Example embodiments of web browsing using a simplified DOM (e.g., within a cloud browser environment and/or a browser as a service environment) in the context of the networked computing environment of FIG. 1 will be described further below with respect to FIG. 12. Additional example embodiments of web browsing using a simplified DOM will be described further below with respect to FIGS. 13-20.

With reference now to FIGS. 2-6, the interaction between various components of the networked computing environment 100 of FIG. 1 will be illustrated. Specifically, FIGS. 2-6 illustrate the interaction between various components of the networked computing environment 100 for the exchange of content between a client computing device 102 and a content provider 104 via the network computing and storage provider 107. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2:
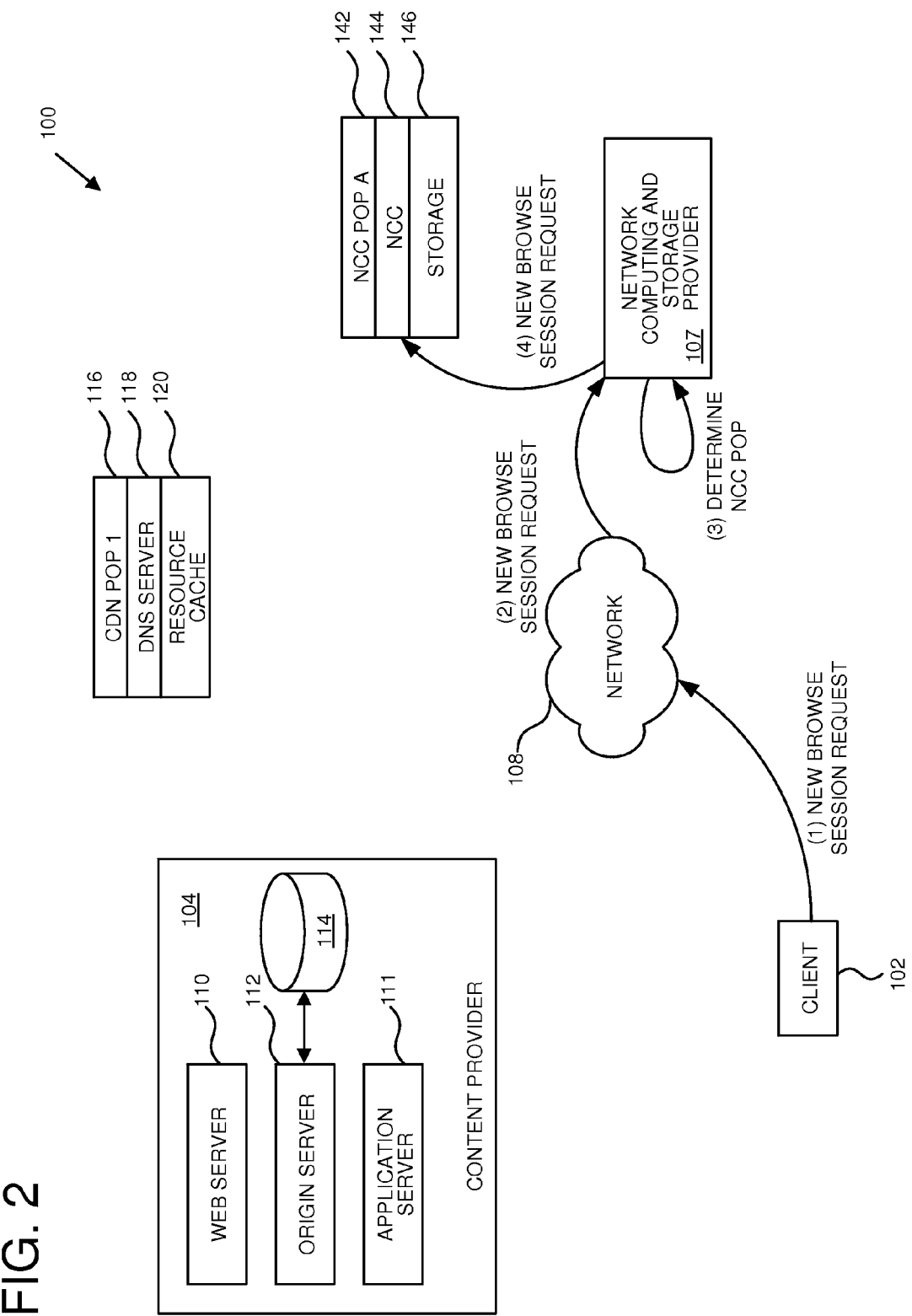
FIG. 2 is a block diagram of the content delivery environment of FIG. 1 illustrating the generation and processing of a new browse session request from a client computing device to a network computing and storage provider.

With reference to FIG. 2, the process can begin with the generation and processing of a browse session request from a client computing device 102 to a network computing and storage provider 107 will be described. Illustratively, the client computing device 102 may load a browser for viewing network content in response to an event or user request. Subsequent to the browser being loaded, the browser may be implemented to request a new browse session. From the perspective of the user of the client computing device, the request for the new browse session corresponds to the intended request to transmit the request to one or more corresponding content providers 104. Illustratively, this request may be generated automatically as a result of the browser loading (e.g., a request for a default or "home" page), or may be generated as a result of a user following a link or entering a network address into an address bar. As illustrated in FIG. 2, the browse session request is transmitted first to a network computing and storage provider 107. In an illustrative embodiment, the network computing and storage provider 107 utilizes a registration application program interface ("API") to accept browse session requests from the client computing device 102. The browse session request can include network address information corresponding to a requested network resource, which may be in any form, including, but not limited to, an Internet Protocol ("IP") address, a URL, a Media Access Control ("MAC") address, etc.

Subsequent to the receipt of the browse session request, the network computing and storage provider 107 may select an associated network computing component (hereinafter "NCC") point of presence (hereinafter "POP") such as NCC POP 142 to service the browse session request. The selection of the NCC POP may determine the processing and network resources available to the instantiated virtual machine. The selection of processing and network resources and the provisioning of software at the NCC POP instance may be done, at least in part, in order to optimize communication with content providers 104 and client computing devices 102.

Figure 3:
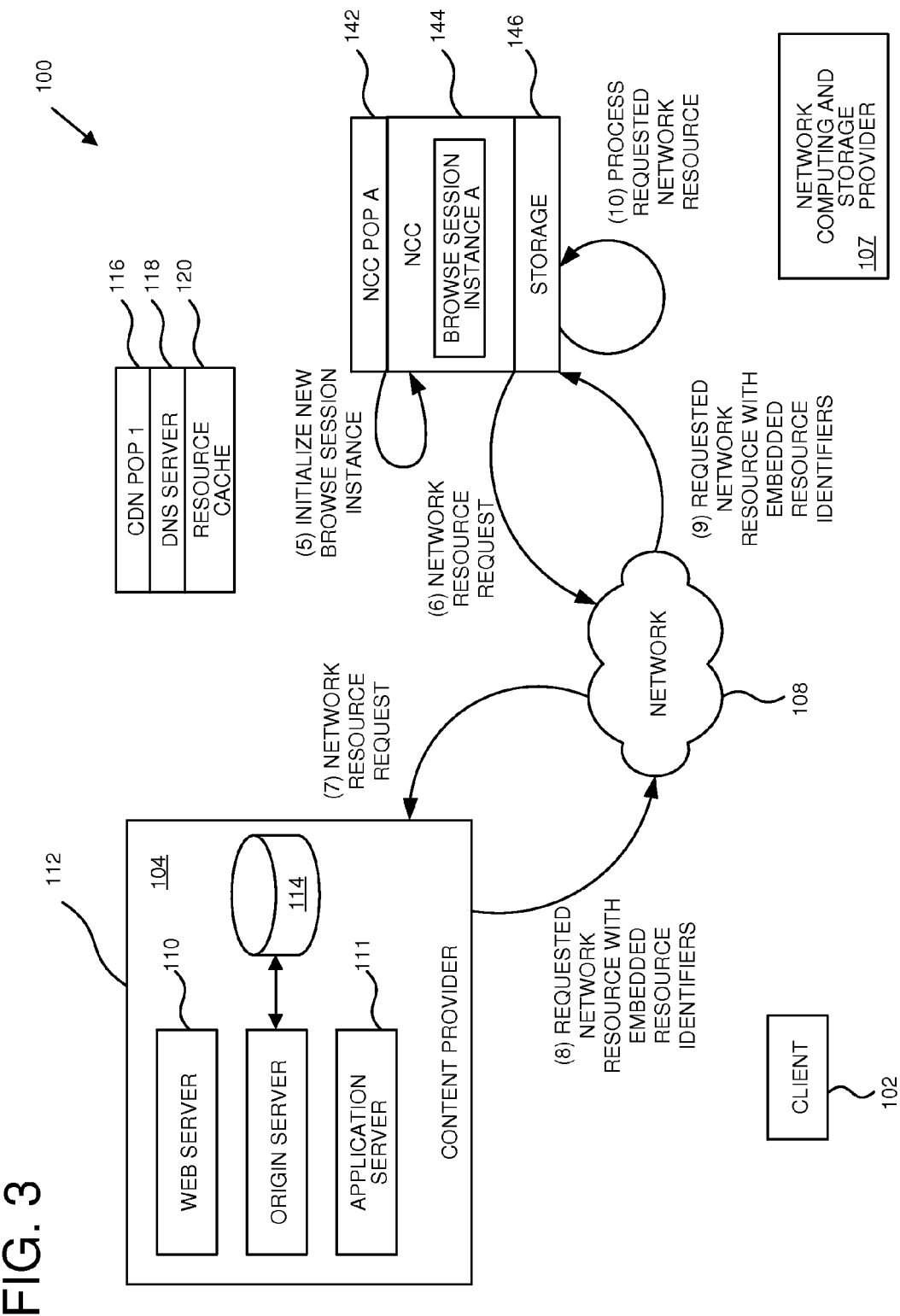
FIG. 3 is a block diagram of the content delivery environment of FIG. 1 illustrating the generation and processing of a request for a network resource from a network computing and storage provider to a content provider.

With reference to FIG. 3, an illustrative interaction for generation and processing of a request for a network resource from a network computing and storage provider 107 to a content provider 104 will be described. As illustrated in FIG. 3, the selected NCC POP 142 may generate a browse session corresponding to one or more content providers based on a browse session request, such as the illustrative browse session request depicted in FIG. 2 above. Illustratively, instantiating a new browse session instance may include loading a new virtual machine instance and/or browser instance at the NCC POP 142, reserving or allocating device memory, storage or cache space, processor time, network bandwidth, or other computational or network resources for the new browse session.

Subsequent to initializing a new browse session instance, NCC POP 142 may provide a request for a network resource to a content provider 104 based on a network address included in the browse session request. For example, a browse session request may include a URL for a Web page, such as "http://www.xyzsite.com/default.htm." NCC POP 142 may resolve the URL to an IP address through a DNS resolver associated with the network computing and storage provider (not shown), and may request the Web page from the content provider 104 at the resolved IP address. In various embodiments, a network resource may be retrieved from any combination of content providers, content delivery network (hereinafter "CDN") servers, or caches associated with the network computing and storage provider 107. For example, the network computing and storage provider may check if a resource is stored in a local cache or in another server or service provider associated with the network computing and storage provider 107. If a network resource is stored in a local or associated location, the NCC POP 142 may retrieve the network resource from the local or associated location rather than from the third party content provider 104 or CDN service provider 106. Illustratively, the NCC POP 142 may provide requests for any number of network resources as included in the browse session request, and may obtain these network resources from any number of different sources, sequentially or in parallel.

As illustrated in FIG. 3, the content provider 104 receives the resource request from the NCC POP 142 and processes the request accordingly. In one embodiment, the content provider 104 processes the resource request as if it were originally provided by the client computing device 102. For example, the content provider 104 may select the type of content, ordering of content, or version of content according to the requirements of the requesting client computing device 102. In another embodiment, the content provider 104 may be provided with information that provides information associated with the NCC POP 142 for utilization in providing the requested content (e.g., an available amount of processing resources or network bandwidth).

Subsequent to obtaining the requested network resource from the content provider 104 (or other source designated by the content provider), the NCC POP 142 may process the network resource to extract embedded resource identifiers and gather information for determination of a remote session browsing configuration. For example, a network resource such as a Web page may include embedded CSS style information and Javascript as well as embedded resource identifiers to additional resources such as text, images, video, audio, animation, executable code, and other HTML, CSS, and Javascript files. In the process of extracting the embedded resource identifiers, the NCC POP 142 may gather information about the processed network resources for later use in the determination of a remote session browsing configuration as discussed below with reference to FIG. 4.

Figure 4:
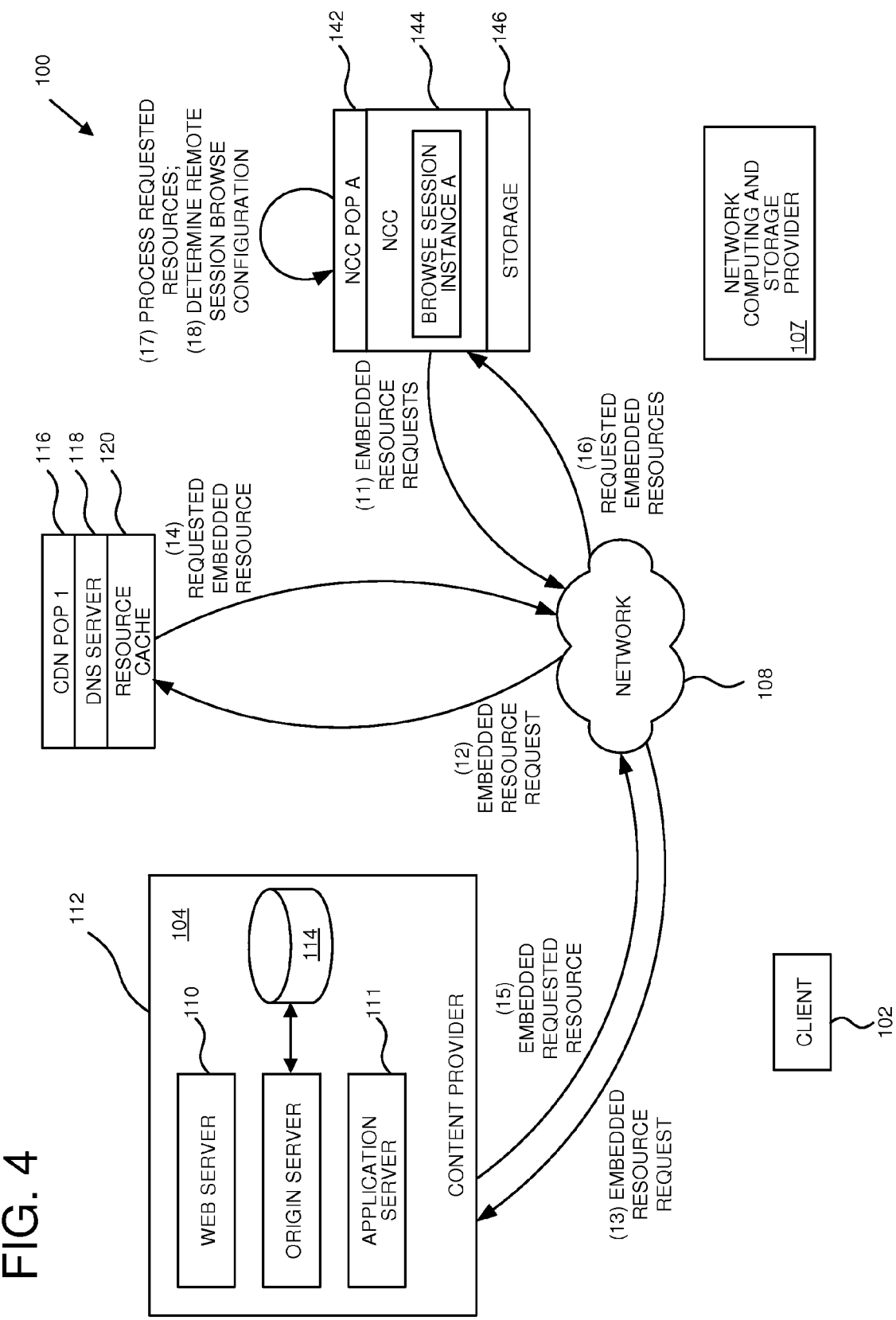
FIG. 4 is a block diagram of the content delivery environment of FIG. 1 illustrating the generation and processing of one or more requests corresponding to one or more embedded resources from a network computing and storage provider to a content provider and content delivery network.

With reference to FIG. 4, an illustrative interaction for generation and processing of one or more requests corresponding to one or more embedded resources from a network computing and storage provider to a content provider and content delivery network is disclosed. As illustrated in FIG. 4, the selected NCC POP 142 may provide resource requests to one or more sources of content such as content provider 104 and CDN POP 116. The resource requests may correspond to embedded resources based on one or more embedded resource identifiers extracted from a requested network resource (e.g., a Web page) as described in FIG. 3 above. In various embodiments, embedded resources may be retrieved from any combination of content providers, CDN servers, or caches associated with the network computing and storage provider 107. For example, the network computing and storage provider may check if an embedded resource is stored in a local cache or in another server or service provider associated with the network computing and storage provider 107. If an embedded resource is stored in a local or associated location, the NCC POP 142 may retrieve the embedded resource from the local or associated location rather than the third party content provider or CDN. Illustratively, the NCC POP 142 may provide requests for any number of embedded resources referenced by a network resource, and may obtain these embedded resources from any number of different sources, sequentially or in parallel. Subsequent to obtaining the requested resources, the NCC POP 142 may process the resources and requested content to determine a remote session browsing configuration for the processing and communication of content to the client computing device 102.

Figure 5:
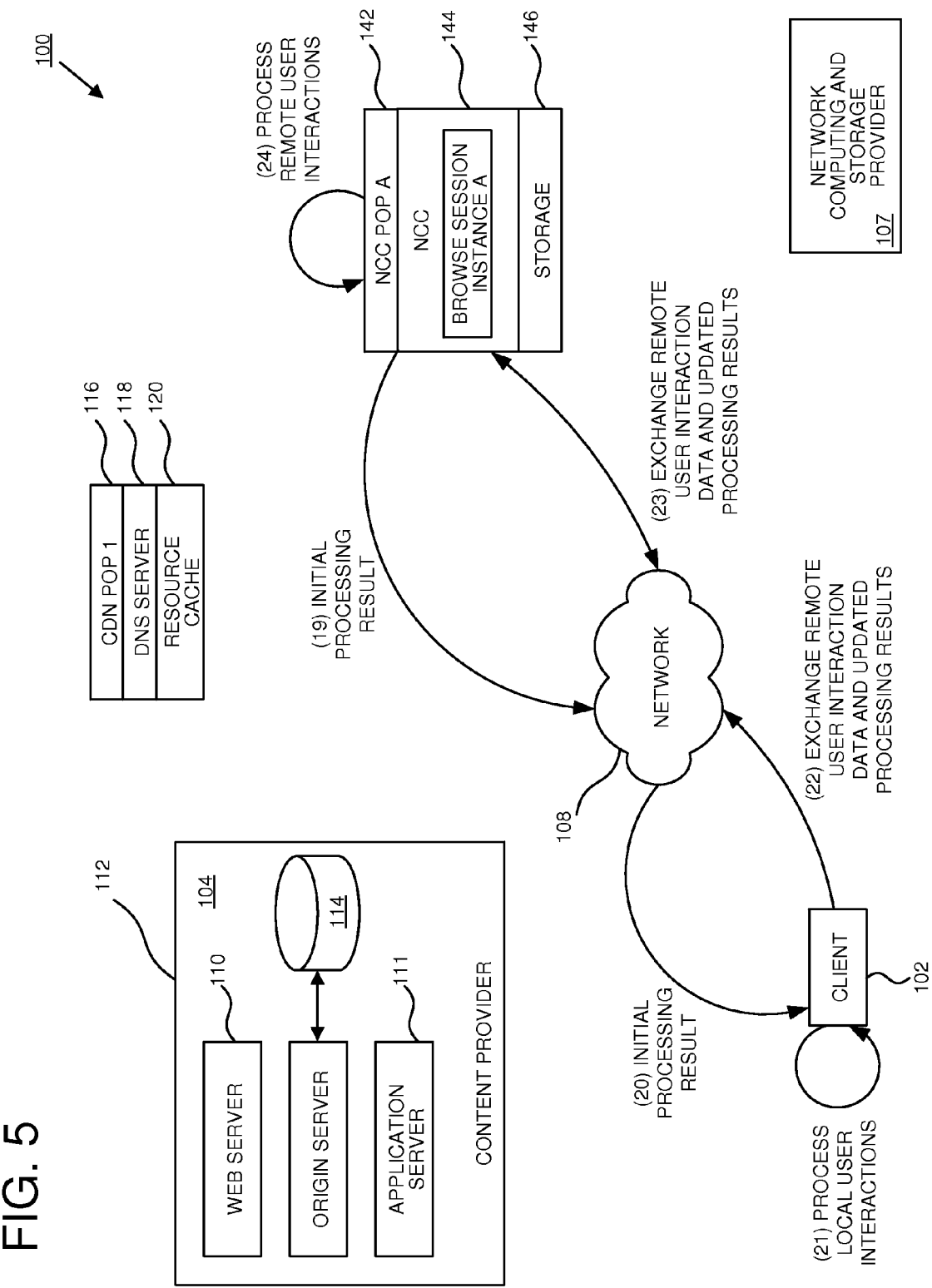
FIG. 5 is a block diagram of the content delivery environment of FIG. 1 illustrating the generation and processing of browse session data and user interaction data between a network computing and storage provider and client computing device.

With reference to FIG. 5, an illustrative interaction for generation and processing of processing results and user interaction data between a network computing and storage provider and client computing device is disclosed. As previously described, in one embodiment, the respective browsers on the instantiated network computing component and the client computing device 102 can exchange browsers' session information related to the allocation and processing of the requested resources at the instantiated network computing component and client computing device. As illustrated in FIG. 5, the selected NCC POP 142 may provide an initial processing result to the client computing device 102 over the network 108. The initial processing result may correspond to requested network content, such as a Web page, along with associated embedded resources processed by the NCC POP 142 in accordance with a selected remote session browsing configuration as described in FIG. 4 above. The NCC POP 142 also makes a determination of which additional processes will be conducted at the NCC POP 142, at the client computing device 102, or both. Subsequent to receiving an initial processing result and the allocation of processes, the client computing device 102 may perform any remaining processing actions on the initial processing result as required by the selected remote session browsing configuration, and may display the fully processed content in a content display area of a browser. The client computing device 102 may process any local user interactions with local interface components or content elements locally, and may provide user interactions requiring remote processing to the network computing and storage provider 107. The network computing and storage provider 107 may provide updated processing results to the client computing device in response to changes to the content or remote user interaction data from the client computing device.

Figure 6:
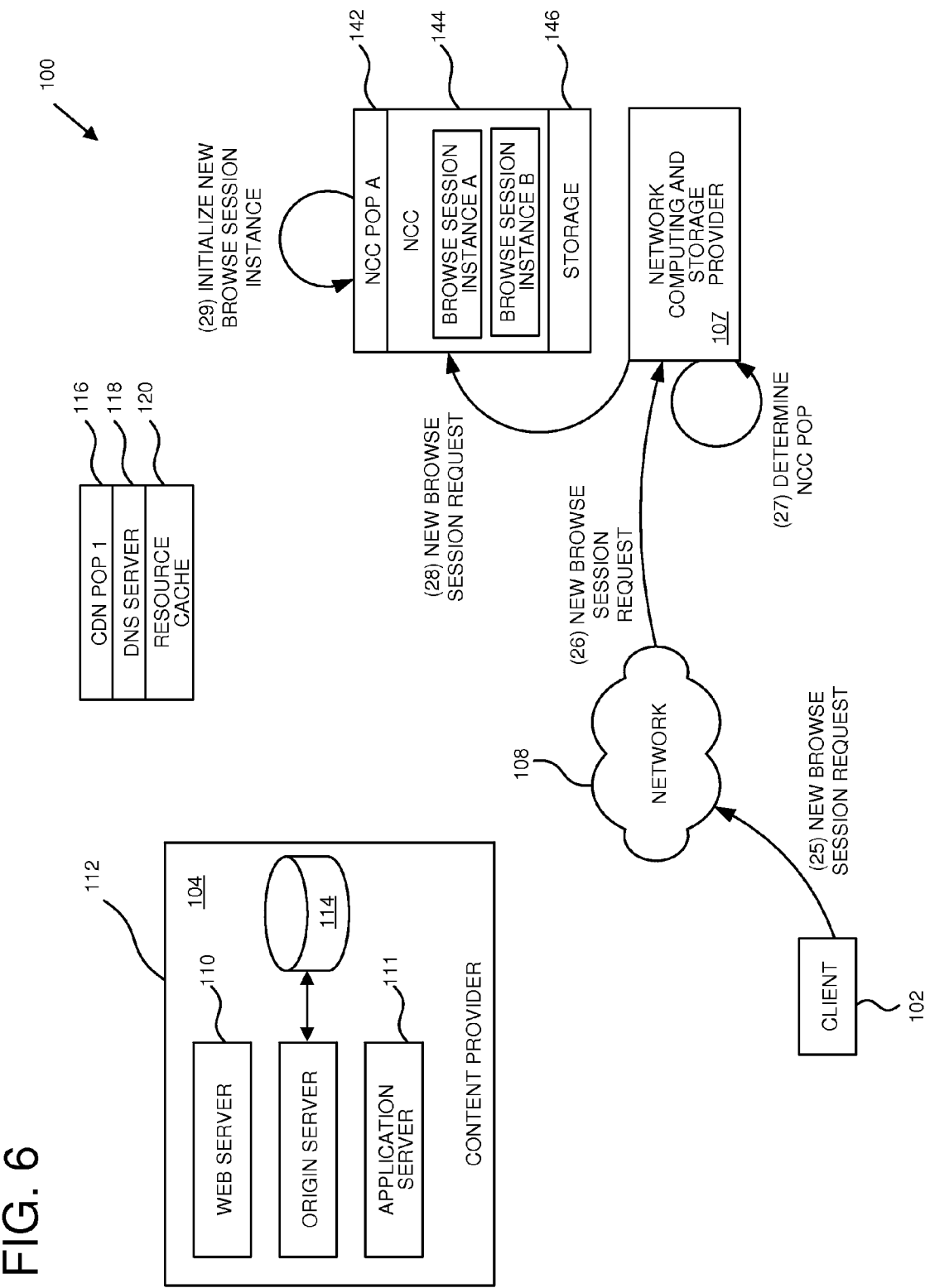
FIG. 6 is a block diagram of the content delivery environment of FIG. 1 illustrating the generation and processing of an additional new browse session request from a client computing device to a network computing and storage provider.

With reference to FIG. 6, a block diagram of the content delivery environment of FIG. 1 illustrating the generation and processing of an additional new browse session request from a client computing device to a network computing and storage provider is disclosed. As illustrated in FIG. 6, a second new browse session request may be sent to network computing and storage provider 107 from client computing device 102 across network 108. In an illustrative embodiment, the network computing and storage provider 107 utilizes a registration API to accept browse session requests from the client computing device 102.

The additional browse session request may be generated by a client computing device 102 in response to a user opening up a new browser window with a new content display area, opening a new content display area in an existing browser window (e.g., opening a new tab in a browser), requesting new network content in an existing content display area (e.g., following a link to a new network resource, or entering a new network address into the browser), or any other user interaction. For example, a user browsing a first Web page corresponding to a first browse session instance may follow a link that opens a new tab or browser window to view a second Web page. In one embodiment, any required steps of obtaining and processing content associated with the second Web page may be performed by the currently instantiated network computing component in which the browser can handle the processing of both resource requests. In another embodiment, the client computing device 102 request may be processed as a new browse session request to the network computing and storage provider 107, including the network address of the second Web page. In this embodiment, the browser on the client computing device may not specifically request a separate browse session, and a user's interaction with the browser on the client computing device 102 may appear to be part of a same browsing session. As described above with regard to FIGS. 2 and 3, the network computing and storage provider 107 may cause an instantiation of a network computing component for obtaining and processing content associated with the second web page. In other embodiments, a new browse session request may be generated by the client computing device 102 corresponding to sections of a network resource (e.g., frames of a Web page), individual network resources, or embedded resources themselves, data objects included in a set of content, or individual network resources.

Illustratively, the additional browse session request may include any number of pieces of data or information including, but not limited to, information associated with a user, information associated with the client computing device 102 (e.g., hardware or software information, a device physical or logical location, etc.), information associated with the network 108, user or browser preferences (e.g., a requested remote session browse protocol, a preference list, a decision tree, or other information), information associated with the network computing and storage provider 107, information associated with one or more pieces of requested network content (e.g., the network address of a network resource), etc. Requested content may include any manner of digital content, including Web pages or other documents, text, images, video, audio, executable scripts or code, or any other type of digital resource.

Subsequent to the receipt of the browse session request, the network computing and storage provider 107 may select an associated network computing component such as NCC POP 142 to service the browse session request. As discussed above with reference to FIG. 2, a network computing and storage provider 107 may select an NCC POP to service a browse session request based on any number of factors, including, but not limited to available NCC POP resources (e.g., available memory, processor load, network load, etc), a financial cost of servicing the browse session request at the NCC POP, the NCC POP location respective to a client computing device 102, content provider 112, or CDN POP 116, a NCC POP cache status (e.g., whether a requested resource is already stored in an NCC POP cache), etc. In one embodiment, the network computing and storage provider 107 may select a number of NCC POPs to service a browse session request. Illustratively, although the network computing and storage provider 107 is depicted here for purposes of illustration as selecting NCC POP 142, the network computing and storage provider 107 may select any extant NCC POP to service the browse session request. For example, a single client computing device 102 may simultaneously or sequentially provide three different browse session requests to the network computing and storage provider 107 corresponding to different network resources. The network computing and storage provider 107 may select different NCC POPs for each browse session request, the same NCC POP for all three browse session requests, or any combination thereof. As discussed above, the decision whether to select a different NCC POP than was utilized for a previous or simultaneous browse session request may be made on the basis of available system resources, randomly, or according to any other factor as discussed above and with regards to FIG. 2.

Figure 7:
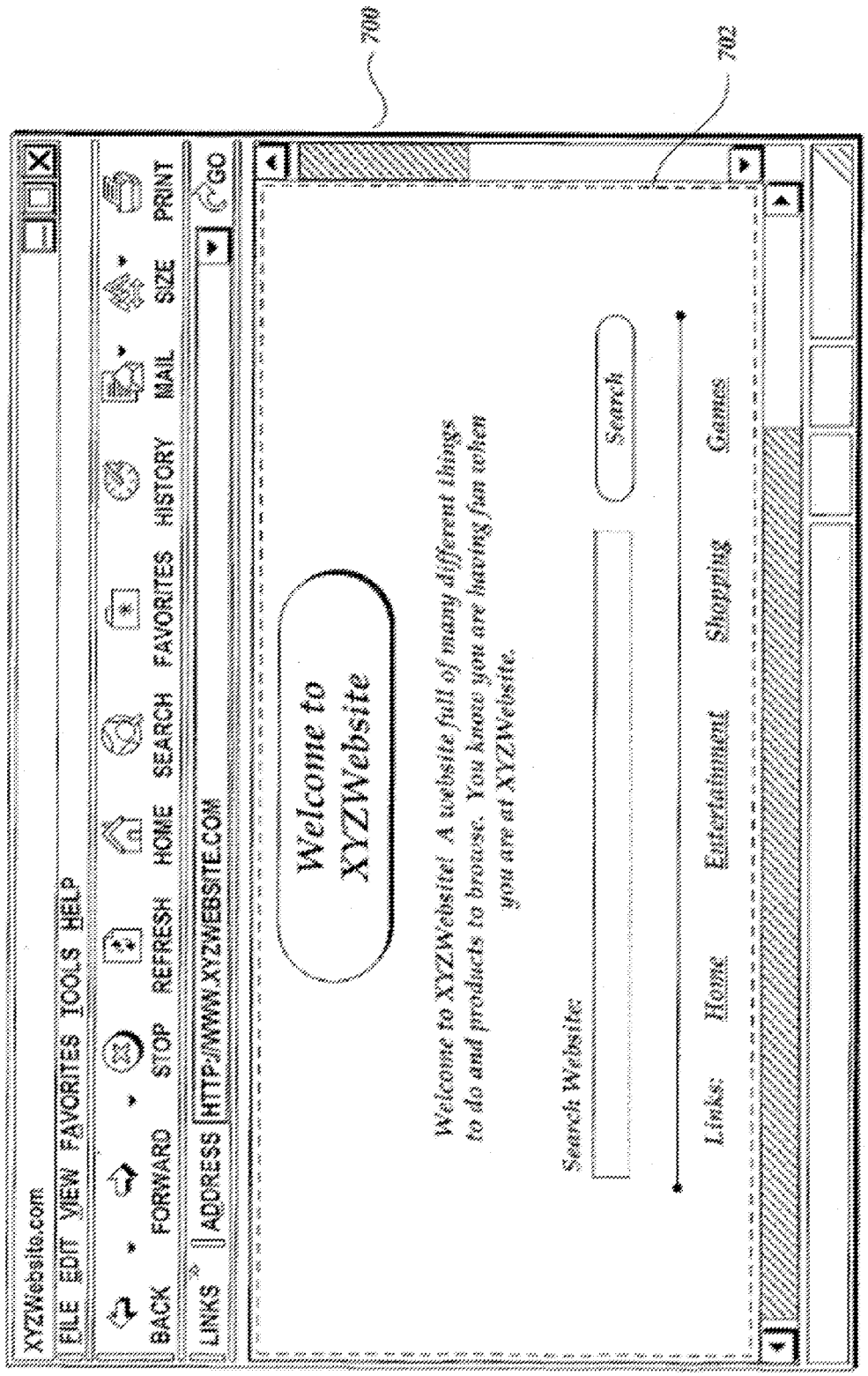
FIG. 7 is a user interface diagram depicting an illustrative browser interface and display of browse session content.

FIG. 7 is a user interface diagram depicting an illustrative browser interface and display of browse session content. As described above with reference to FIG. 5, a browser 700 may have a content display area 702, as well as one or more one or more local interface components. These local interface components may include toolbars, menus, buttons, address bars, scroll bars, window resize controls, or any other user interface controls. Illustratively, local interface components may be displayed as separate from the content display area or may be overlaid or embedded in the content display area.

Interactions with local interface components may be treated as local user interactions or remote user interactions depending on the processing required by the interaction and the remote session browsing configuration. For example, the selection of a preferences option in a browser menu may be handled entirely as a local user interaction by a browser. The processing required to display the menu, provide visual feedback regarding the selection, display the preferences window, and process the changes made to the browser preferences may be performed locally. As discussed above, processing user interactions locally may provide greater responsiveness at the browser as opposed to sending user interaction data to the NCC POP 142 for processing. As another example, when using a remote session browsing configuration that specifies extensive processing on the NCC POP 142 (e.g., a remote session browsing configuration using a remote session communication protocol such as RDP), the selection of a content refresh button in a browser toolbar may be handled both as a local user interaction and a remote user interaction. The limited processing required to provide interface feedback corresponding to the button selection may be handled at the client computing device 102 in order to provide the appearance of interface responsiveness, while the refresh command, which may require processing of the network content displayed in the content display area of the browser, may be sent as user interaction data to the NCC POP 142 for processing. The NCC POP 142 may then transmit updated processing results corresponding to the refreshed network content back to the client computing device 102 for display.

Figure 8:
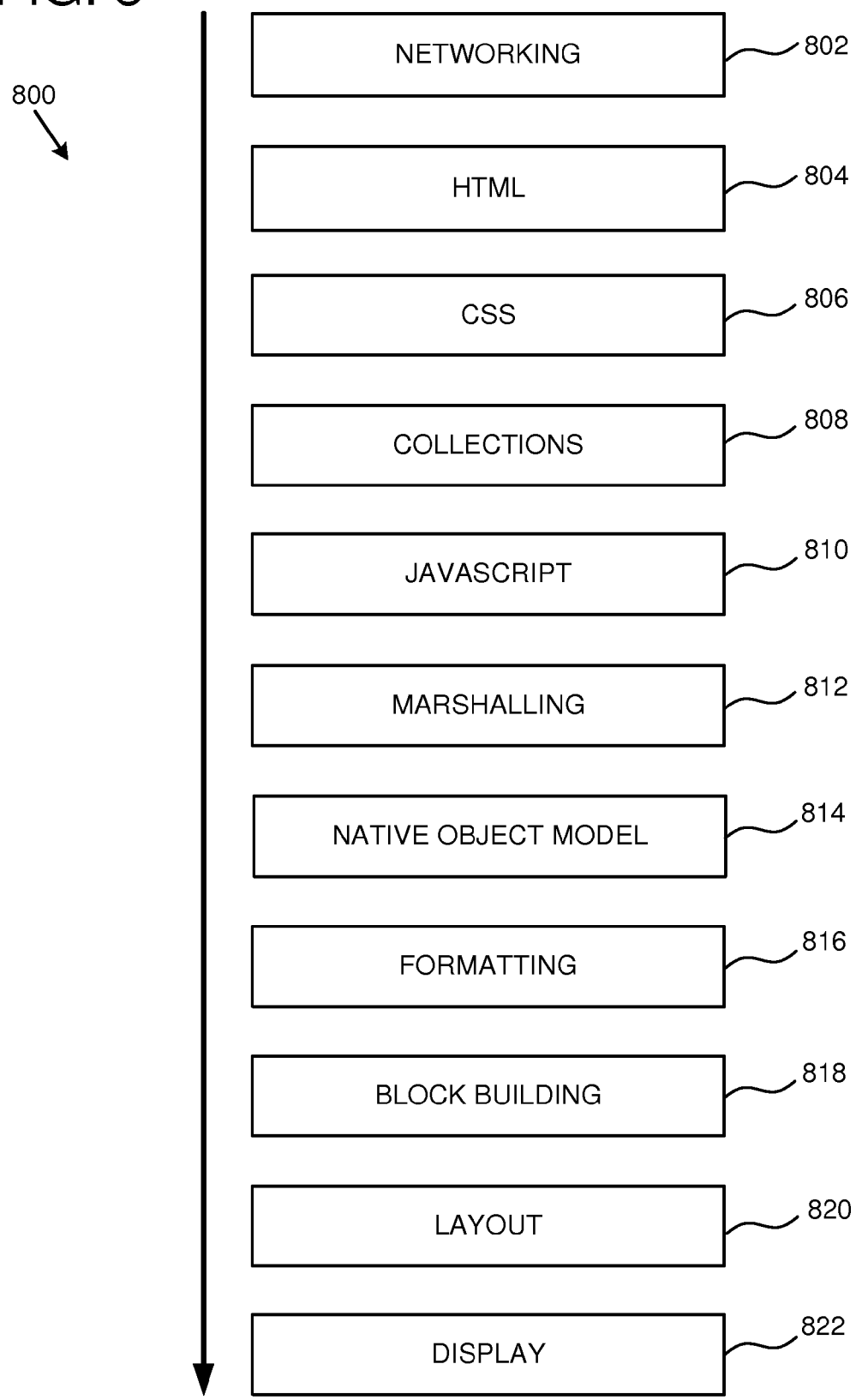
FIG. 8 is a diagram depicting illustrative browser content processing actions as a series of processing subsystems.

FIG. 8 is a diagram depicting illustrative browser content processing actions as a series of processing subsystems 800. In many embodiments, a browser may process sets of content (e.g., network resources such as web pages and associated embedded resources) in a series of processing actions (processing operations). Illustratively, and as described above with reference to FIGS. 3-5, a remote session browsing configuration may specify a split between processing actions performed at a network computing and storage provider (e.g., an NCC POP) and processing actions performed at a client computing device 102. This split may designate some processing actions to be performed by each of the NCC POP and client computing device 102, or may assign all processing actions to a single device or component. For example, an NCC POP may perform all of these various processing actions at the browse session instance, and send fully processed RDP processing results to the client computing device 102 for bitmap assembly and display. Any number of different remote session browsing configurations may be used by one or more browse sessions instances running at an NCC POP.

One of skill in the relevant art will appreciate that the subsystems shown here are depicted for the purpose of illustration, and are not intended to describe a necessary order or a definitive list of browser subsystems. Various browser software components may implement additional or fewer browser subsystems than are shown here, and may order the subsystems or corresponding processing actions in any number of different ways. Although the processing subsystems 800 depicted here for purposes of illustration are directed at the processing of Web pages or other Web content, one of skill in the relevant art will appreciate that the processing of other file types or network resources may be broken up in a similar manner. For example, one of skill in the relevant art will appreciate that a similar schema may be developed for the processing of images, video, audio, database information, 3d design data, or any other file format or type of data known in the art. Similar schema may also be developed for any number of device operating system or software framework processing operations, such as scheduling, memory or file management, system resource management, process or service execution or management, etc. Further, although the HTML protocol and RDP remote session communication protocols are discussed herein for the purposes of example, one of skill in the relevant art will appreciate that a remote session browsing configuration may implement any number of remote communication protocols for any number of specified processing actions, and that a remote session browsing configuration may be formulated to perform any fraction or combination of the actions identified below at any combination of the client computing device 102 and network computing and storage provider 107.

Illustratively, the first processing subsystem involved in the processing and display of network content is the networking subsystem 802. Illustratively, the networking subsystem 802 may be responsible for all communication between the browser and content provider, including local caching of Web content. The networking subsystem is generally limited by the performance of the user's network. A remote session browsing configuration that splits processing actions at the networking subsystem 802 might include a remote session browsing configuration utilizing an HTML remote session communication protocol, where one or more caching or resource retrieval actions were performed at the NCC POP, but parsing and processing of the content was performed at the client computing device.

As network resources such as HTML documents are downloaded from the server they may be passed to an HTML subsystem 804 which parses the document, initiates additional downloads in the networking subsystem, and creates a structural representation of the document. Modern browsers may also contain related subsystems which are used for XHTML, XML and SVG documents. A remote session browsing configuration that splits processing actions at the HTML subsystem 804 might include a remote session browsing configuration utilizing an HTML remote session communication protocol, where an initial HTML page is processed at the NCC POP in order to extract embedded resource identifiers, but additional parsing and processing of the content is performed at the client computing device. In another embodiment, a remote session browsing configuration that splits processing actions at the HTML subsystem 804 might perform initial processing to create the structural representation of the HTML document, and provides a processing result including the structural representation and associated embedded resources to the client computing device for processing.

When CSS is encountered, whether inside an HTML document or an embedded CSS document, it may be passed to a CSS subsystem 806 to parse the style information and create a structural representation that can be referenced later. Illustratively, a remote session browsing configuration that splits processing actions at a CSS subsystem 806 may construct a processing result including the CSS structural representation and HTML structural representation, and provide the processing result and associated embedded resources to the client computing device for processing.

HTML documents often contain metadata, for example the information described in a document header or the attributes applied to an element. The collections subsystem 808 may be responsible for storing and accessing this metadata. A remote session browsing configuration that splits processing actions at a collections subsystem 808 may construct a processing result including processed metadata along with any other structural representations discussed above, and provide the processing result and associated embedded resources to the client computing device for processing.

When Javascript is encountered, it may be passed directly to a JavaScript subsystem 810 responsible for executing the script. The Javascript subsystem 810 has been examined fully over the years, and may be one of the most well known browser subsystems in the art. A remote session browsing configuration that splits processing actions at a Javascript subsystem 810 may construct a processing result including an internal representation of one or more Javascript scripts, including, but not limited to state data or a representation of the script in a native or intermediate form, as well as any other processed structures or data discussed above, and provide the processing result and associated embedded resources to the client computing device for processing.

Because many JavaScript engines are not directly integrated into the browser, there may be a communication layer including the marshalling subsystem 812 between the browser and the script engine. Passing information through this communication layer may generally be referred to as marshaling. A remote session browsing configuration that splits processing actions at a marshalling subsystem 812 may construct a processing result including marshalling data as well as any other processed structures, scripts, or data discussed above, and provide the processing result and associated embedded resources to the client computing device for processing.

In some embodiments, JavaScript interacts with an underlying network resource such as a Web document through the Document Object Model APIs. These APIs may be provided through a native object model subsystem 814 that knows how to access and manipulate the document and is the primary interaction point between the script engine and the browser. Illustratively, a remote session browsing configuration that splits processing actions at a native object model subsystem 814 may construct a processing result including native object model state data or API calls as well as any other processed structures, scripts, or data discussed above, and provide the processing result and any other associated embedded resources to the client computing device for processing.

Once the document is constructed, the browser may needs to apply style information before it can be displayed to the user. The formatting subsystem 816 takes the HTML document and applies styles. Illustratively, a remote session browsing configuration that splits processing actions at a formatting subsystem 816 may construct a processing result including an HTML representation with applied styles, as well as any other processed state data, API calls, structures, scripts, or data discussed above, and provide the processing result and any other associated embedded resources to the client computing device for processing.

In one embodiment, CSS is a block based layout system. After the document is styled, the next step, at a block building subsystem 818, may be to construct rectangular blocks that will be displayed to the user. This process may determine things like the size of the blocks and may be tightly integrated with the next stage, layout. A remote session browsing configuration that splits processing actions at a block building subsystem 818 may construct a processing result including block information, as well as any other processed state data, API calls, structures, scripts, or data discussed above, and provide the processing result and any other associated embedded resources to the client computing device for processing.

Subsequent to the browser styling the content and constructing the blocks, it may go through the process of laying out the content. The layout subsystem 820 is responsible for this algorithmically complex process. Illustratively, a remote session browsing configuration that splits processing actions at a layout subsystem 820 may process the various state data, API calls, structures, scripts, or data discussed above to construct a processing result including layout information for the client computing device. Illustratively, an NCC POP may make use of various data or settings associated with the client computing device or browser (e.g., as provided in the initial browse session request) in order to generate a suitable layout for the client computing device. For example, a mobile device may provide a screen resolution and a display mode to the NCC POP. The NCC POP may base layout calculations on this screen resolution and display mode in order to generate a processing result corresponding to a content representation suitable for a browser running on the mobile device. Illustratively, in various embodiments, any other subsystem implemented by the NCC POP may make use of data associated with the client computing device or browser in generating a processing result for the client.

The final stage of the process may occur inside the display subsystem 822 where the final content is displayed to the user. This process is often referred to as drawing. A remote session browsing configuration that splits processing actions at the networking subsystem 802 might include a remote session browsing configuration utilizing an RDP remote session communication protocol, where nearly all processing is performed at the NCC POP, and a processing result including bitmap data and low level interface data are passed to the client computing device for display.

Figure 9:
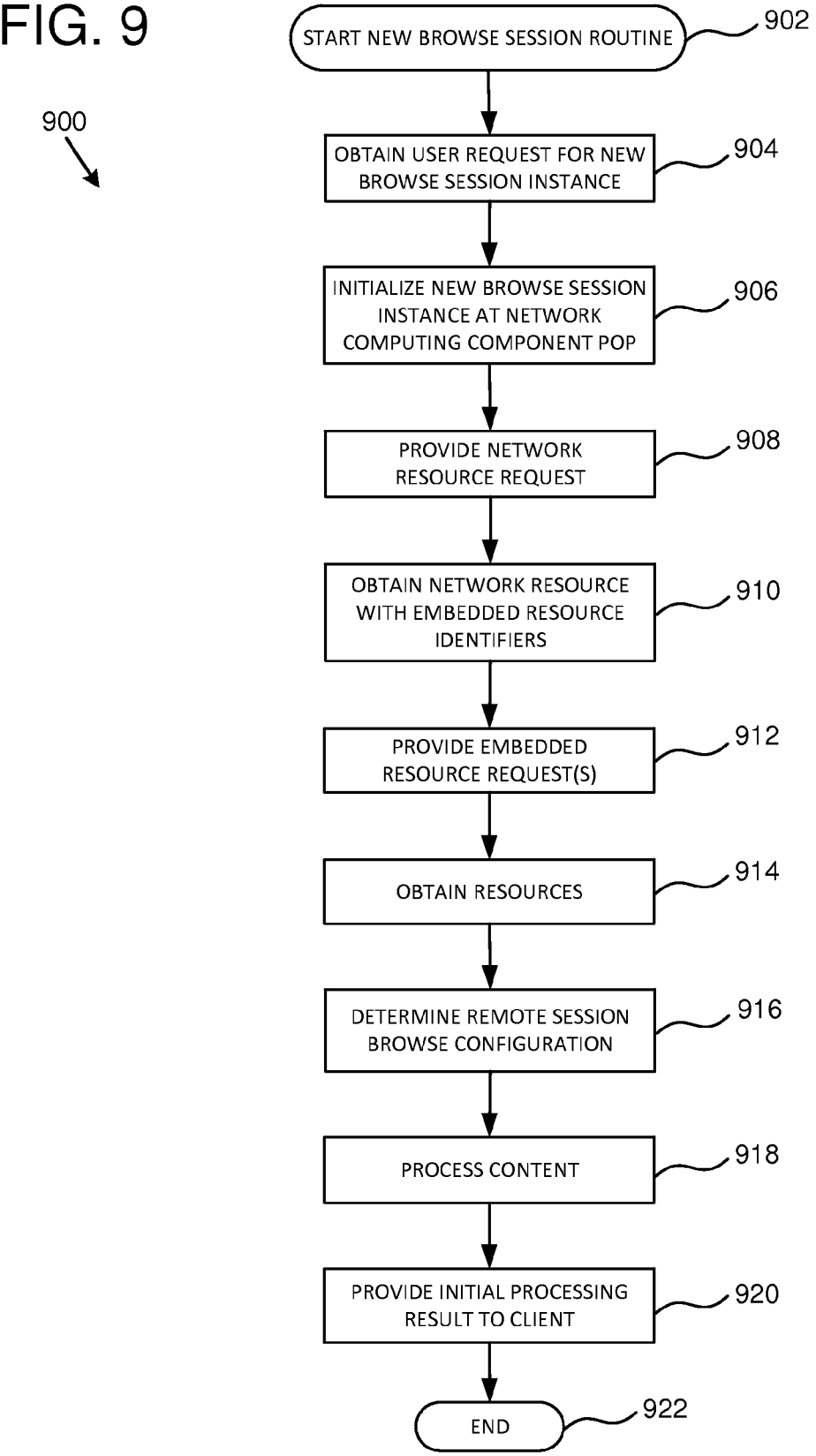
FIG. 9 is a flow diagram illustrative of a new browse session routine implemented by network computing and storage provider.

FIG. 9 is a flow diagram illustrative of a new browse session routine 900 implemented by network computing and storage provider 107 of FIG. 1. New browse session routine 900 begins at block 902. At block 904, the network computing and storage provider 107 receives a new browse session request from client computing device 102. As previously described, the client computing device 102 may load a browser for viewing network content in response to an event or user request. Subsequent to the browser being loaded, the browser may be implemented request a new browse session. From the perspective of the user of the client computing device, the request for the new browse session corresponds to the intended request to transmit the request to one or more corresponding content providers 104. Illustratively, this request may be generated automatically as a result of the browser loading (e.g., a request for a default or "home" page), or may be generated as a result of a user following a link or entering a network address into an address bar. This browse session request may include one or more addresses or references to various network resources or other content requested by the client computing device 102. In an illustrative embodiment, the browse session request is transmitted in accordance with an API.

At block 906 the network computing and storage provider 107 may select an associated NCC POP to instantiate a new browse session based on the browse session request. As discussed above with reference to FIG. 1, a network computing and storage provider 107 may include any number of NCC POPs distributed across any number of physical or logical locations. A network computing and storage provider 107 may select a NCC POP to service a browse session request based on any number of factors, including, but not limited to available NCC POP resources (e.g., available memory, processor load, network load, etc.), a financial cost of servicing the browse session request at the NCC POP, the NCC POP location respective to a client computing device 102, content provider 104, or CDN POP 116, a NCC POP cache status (e.g., whether a requested resource is already stored in an NCC POP cache), etc.

In one embodiment, the network computing and storage provider 107 may select a number of NCC POPs to service a browse session request. For example, the network computing and storage provider 107 may select two NCC POPs with different logical locations in the network. Each NCC POP may independently request and process network content on the behalf of the client computing device 102, and the client computing device 102 may accept data from the first NCC POP to return a processing result. Subsequent to being selected by the network computing and storage provider 107, NCC POP 142 may obtain the browse session request. In one embodiment, NCC POP 142 may have the browse session request forwarded to it by a component of network computing and storage provider 107. In another embodiment, NCC POP 142 or client computing device 102 may receive connection information allowing the establishment of direct communication between NCC POP 142 and client computing device 102. Illustratively, NCC POP 142 may be provided with the browse session request originally provided to network computing and storage provider 107, may be provided with a subset of information (e.g., just a network address of requested content), or may be provided additional information not included in the original browse session request.

Subsequent to the NCC POP 142 being selected, the network computing and storage provider 107 may cause the NCC POP 142 to instantiate a new browse session. Illustratively, instantiating a new browse session instance may include loading a new virtual machine instance and/or browser instance at the NCC POP 142, reserving or allocating device memory, storage or cache space, processor time, network bandwidth, or other computational or network resources for the new browse session. Illustratively, one or more characteristics of the new browse session instance and/or browser instance may be based on client computing device 102 information included in the browse session request. For example, the browse session request may include a device type or browser type, a device screen resolution, a browser display area, or other information defining the display preferences or capabilities of the client computing device 102 or browser. The NCC POP 142 may accordingly instantiate a virtual machine instance and/or a browser instance with the same or similar capabilities as the client computing device 102. Illustratively, maintaining a virtual machine instance and/or browser with the same or similar capabilities as the client computing device 102 may allow the NCC POP 142 to process network content according to the appropriate dimensions and layout for display on the particular client computing device 102.

In some embodiments, the NCC POP 142 may utilize an existing virtual machine instance and/or browser instance in addition to, or as an alternative to, instating a new browse session. For example, subsequent to the NCC POP 142 being selected, the network computing and storage provider 107 may cause the NCC POP 142 to associate an existing browser instance and/or virtual machine instance, such as one or more instances previously instantiated at the NCC POP 142, with the new browse session request. Illustratively, an existing browser session and/or virtual machine instance may correspond to another browse session, remote application session, or other remote process associated with the user or client computing device 102, or may be a previously instantiated software instance from an unrelated browse session or remote process. In other embodiments, the NCC POP 142 may instantiate a new browser or other application process in an existing virtual machine instance, or may combine the utilization of previously instantiated and newly instantiated software processes in any number of other ways. In still further embodiments, the network computing and storage provider or NCC POP 142 may instantiate any number of new virtual machine instances and/or browser instances (or make use of existing instantiated instances) based on a single browse session request.

At block 908 the network computing and storage provider 107 may provide a request for one or more network resources to a content provider or CDN service provider based on a network address included in the browse session request. In various embodiments, one or more network resources may be additionally or alternately retrieved from a cache local to the NCC POP 142 or otherwise associated with the network computing and storage provider 107. One of skill in the art will appreciate that, in the case of other embodiments, the link or network address may correspond to a document or file stored in a digital file locker or other network storage location or at a cache component associated with the network computing and storage provider 107 or client computing device 102. In some embodiments, the new session request may include a document or file in addition to or as an alternative to a network address. At block 910, the network computing and storage provider 107 obtains the one or more network resources. Subsequent to obtaining the requested network resource, the NCC POP 142 may process the network resource to extract embedded resource identifiers.

At block 912, the network computing and storage provider 107 may provide resource requests to one or more sources of content such as content providers, CDN service providers, and caches. The resource requests may correspond to embedded resources based on the one or more embedded resource identifiers extracted from the one or more network resource as described in block 910 above. At block 914, the network computing and storage provider 107 may obtain these embedded resources from any number of different sources, sequentially or in parallel.

At block 916, the network computing and storage provider 107 may process the one or more network resources and associated embedded resources to determine a remote session browsing configuration for the processing and communication of content to the client computing device 102. A remote session browsing configuration may include any proprietary or public remote protocol allowing exchange of data and user interactions or requests between a client and a remote server. The remote session browsing configuration may illustratively include both a remote session communication protocol and a processing schema for providing processed (or unprocessed) content to a client computing device for display in the content display area of a browser.

Illustratively, a remote session browsing configuration may define or specify a remote session communication protocol, including, but not limited to, a network protocol, signaling model, transport mechanism, or encapsulation format for the exchange of state data, user interactions, and other data and content between the network computing and storage provider and the client computing device. Examples of remote session communication protocols known in the art include Remote Desktop Protocol (RDP), X-Windows protocol, Virtual Network Computing (VNC) protocol, Remote Frame Buffer protocol, HTML, etc. For example, RDP illustratively specifies a number of processing mechanisms for encoding client input (e.g., mouse movement, keyboard input, etc.) into protocol data units for provision to a remote computing device, and corresponding mechanisms for sending bitmap updates and low level interface information back to the client device. As another example, the HTML protocol illustratively provides a mechanism for providing files defining interface information and containing resources references from a server to a client, and a corresponding mechanism for a client computing device to provide requests for additional files and resources to the server. In one embodiment, the NCC POP 142 may provide an initial communication to the client computing device 102 after determining the remote session communication protocol. This initial communication may allow the client computing device 102 to prepare to receive communications in the selected remote session communication protocol, and, in the case of pull remote session communication protocols like HTTP, may cause the client computing device to send an initial resource request to the browse session instance running on the NCC POP 142.

Each remote session browsing configuration may additionally define a split of processing actions between the network computing and storage service (e.g., NCC POP 142) and the client computing device (e.g., client computing device 102). In one embodiment, a particular split of processing actions may be based on or mandated by a particular remote session communication protocol. In another embodiment, a remote session communication protocol may allow several different splits of processing actions depending on the implementation or configuration of the protocol. For the purpose of illustration, many pieces of network content (e.g., Web pages, video, Flash documents) may require various processing actions before being displayed on a computing device. A Web page, for example, may be parsed to process various HTML layout information and references to associated resources or embedded content such as CSS style sheets and Javascript, as well as embedded content objects such as images, video, audio, etc. The HTML and each referenced object or piece of code will typically be parsed and processed before a representative object model corresponding to the Web page may be constructed. This object model may then be processed further for layout and display in a content display area of a browser at the client computing device 102. Illustrative browser processing actions are described in greater detail below with reference to FIG. 8. One of skill in the art will appreciate that, in the case of other embodiments or applications, various other processing actions may be required.

A remote session browsing configuration may specify that various of the processing actions required for display of a piece of network content be performed at the remote computing device, such as the NCC POP 142, rather than at the client computing device 102. Network content partially (or wholly) processed at the network computing and storage provider may be referred to as a processing result. As discussed below, the split of processing actions may be associated with or linked to the remote session communication protocol used for exchanging data and client input between the NCC POP 142 and client computing device 102.

For example, a remote session communication protocol such as RDP that transmits a processing result including low level interface information and bitmaps to the client computing device 142 for display may be associated with a remote session browsing configuration that specifies performing all, or nearly all, of the necessary content processing actions at the NCC POP 142. While using RDP, the NCC POP 142 may, for example, run a full instance of a browser the NCC POP 142 and transmit a processing result consisting of bitmap updates corresponding to a representation of the displayed content to the client computing device 102. The client computing device 102, in this example, may merely be required to assemble the transmitted bitmap updates for display in the content display area of the browser, and may perform none of the processing of the actual HTML, Javascript, or data objects involved in the display of an illustrative piece of network content. As another example, a remote session browsing configuration utilizing a remote session communication protocol such as HTML may transmit network content in a largely unprocessed form. The client computing device 102 may thus perform all of the processing actions required for display of network content while the NCC POP 142 performs little or no processing.

The NCC POP 142 may base its determination of a remote session browsing configuration on any number of factors, including, but not limited to, one or more characteristics of one or more of the requested resources, content provider 104, or CDN service provider 106, one or more characteristics of the content address or domain, one or more characteristics of the client computing device 102, browser or application, user, one or more characteristics of the NCC POP 142, or one or more characteristics of the network or network connection, etc. Characteristics of requested resources may include, but are not limited to, a data format, a content type, a size, processing requirements, resource latency requirements, a number or type of interactive elements, a security risk, an associated user preference, a network address, a network domain, an associated content provider, etc. Characteristics of a content provider 104, CDN service provider 106, computing device 102, or NCC POP 142 may include, but are not limited to, processing power, memory, storage, network connectivity (e.g., available bandwidth or latency), a physical or logical location, predicted stability or risk of failure, a software or hardware profile, available resources (e.g., available memory or processing, or the number of concurrently open software applications), etc. The NCC POP 142 may further consider perceived security threats or risks associated with a piece of content or domain, preferences of a client computing device or a content provider, computing or network resource costs (e.g., a financial cost of processing or bandwidth, resource usage, etc.), predetermined preferences or selection information, any additional processing overhead required by a particular remote session browsing configuration, a cache status (e.g., whether a particular resources is cached at a NCC POP 142, at the client computing device 102, or at other network storage associated with the network computing and storage provider), a predicted delay or time required to retrieve requested network content, a preferred content provider or agreements with a content provider for a particular remote session browsing configuration or level of service, a remote session browsing configuration being used for another (or the current) browse session by the same user, or any other factor.

In some embodiments, an NCC POP 142 may base a determination of a remote session browsing configuration on past behavior or practice. For example, an NCC POP 142 that has determined a remote browse session configuration for a particular resource in the past may automatically select the same remote browse session configuration when the resource is requested by the same (or potentially a different) user. As another example, a user that has a history of frequently accessing Web sites with extensive processing requirements may automatically be assigned a remote session browsing configuration that performs the majority of processing at the NCC POP 142. In other embodiments, an NCC POP 142 may base a determination of a remote browse session configuration on predictions of future behavior. For example, an NCC POP 142 may base its determination of a remote browse session configuration for a particular resource on an analysis of past determinations made for a particular Web site, network domain, or set of related resources. A content provider that historically has provided video-heavy Web pages may be associated with a remote session browsing configuration that emphasizes video performance at the client computing device 102. Illustratively, past historical analysis and future predictions may be considered as one or more of a number of factors on which to base the remote session browsing configuration determination process, or may be definitive in the decision making process. For example, once an NCC POP 142 determines a remote session browsing configuration for a particular content provider, it may skip the remote session browsing configuration determination process for any future resources served from the content provider. Illustratively, the NCC POP 142 may re-determine a remote session browsing configuration to be associated with the content provider after a fixed period of time, or after the NCC POP 142 has identified or determined a change in the content being served by the content provider.

In other embodiments, a network resource, Web site, network domain, content provider, or other network entity may specify or otherwise request the use of a particular remote browse session configuration in a resource tag, metadata, or other communication with an NCC POP 142. The NCC POP 142 may treat the request as definitive, or may consider the request as one of multiple factors to be considered in the decision making process.

For example, a remote session browsing configuration utilizing a remote session communication protocol such as RDP may specify extensive processing to occur at the network computing and storage provider 107 (e.g., at NCC POP 142) rather than at the client computing device 102. The remote session browsing configuration may thus leverage the processing power of the NCC POP 142 to achieve lower latencies and presentation delay when dealing with network content that requires a great deal of pre-processing (e.g., content with a great deal of CSS or Javascript information defining page layout). The NCC POP 142 may therefore select a remote session browsing configuration that performs a substantial amount of processing at the network computing and storage provider 107 and utilizes RDP or a similar remote session communication protocol for communication of processing-intensive content. Conversely, a remote session browsing configuration that utilizes a remote session communication protocol such as HTML may specify extensive processing at the client computing device 102 rather than at the network computing and storage provider 107. The remote session communication protocol may thus achieve smaller delays and smoother presentation when presented with simple network content that requires very little processing or network content that requires rapid change in displayed content after its initial load. For example, a Web page with embedded video may perform better performing the majority of processing locally and utilizing HTML rather than RDP as a remote session communication protocol. A remote session browsing configuration specifying extensive processing at the network computing and storage provider 107 must process the video at the NCC POP 142 and rapidly send screen updates (e.g. by RDP) to the client computing device 102, potentially requiring a great deal of bandwidth and causing choppy playback in the browser, while a remote session browsing configuration specifying local processing may provide raw video information directly to the client computing device 102 for display (e.g. by HTML), allowing for client side caching and a smoother playback of content.

As a further example, the NCC POP 142 in communication with a client computing device 102 with extremely limited processing power may elect to use a remote session browsing configuration that requires very little processing by the client computing device, for example, using RDP to transmit NCC POP 142 processed results. Conversely, an NCC POP 142 providing an extremely interactive Web page may elect to use a remote session browsing configuration that allows the client computing device 102 to handle user interactions locally in order to preserve interface responsiveness, for example, using HTML to transmit substantially unprocessed data. As a still further example, a NCC POP 142 may base the determination of a remote session browse configuration on preferences provided by the client computing device 102. A client computing device 102 may illustratively include preferences for a remote session browse configuration in an initial browse session request, or at any other time. The NCC POP 142 may utilize these preferences as an alternative to, or in addition to any other factor or decision metric. Illustratively, allowing the client computing device 102 to set or influence the selection of a remote session browse configuration allows the NCC POP 142 to take user preferences in account when determining a remote session browse configuration. For example, a user worried about initial page load times may prefer to use a remote session browsing configuration heavy on remote processing and utilizing an RDP remote session communications protocol, while a user wishing to maintain an extremely responsive interface may prefer using a remote session browsing configuration that performs the majority of the processing on the client computing device 102, for example, using an HTML remote session communication protocol.

Illustratively, the NCC POP 142 may base a determination of a remote browsing configuration on any factor or combination of factors. For example, the NCC POP 142 may select a remote session browsing configuration based on a single factor, or may assign weights to one or more factors in making a determination. In some embodiments, the determination process of the NCC POP 142 may change based on one or more factors described above. For example, an NCC POP 142 communicating with a client computing device 102 over a network with a surplus of unused bandwidth may give a low weight to factors such as the network requirements of a remote browse session, and may give a higher weight to factors such as the latency of page interactions, while an NCC POP 142 communicating with a client computing device 102 over a limited bandwidth network may give a higher weight to factors dealing with the efficiency of the remote session browse protocol over a network.

In one embodiment, the NCC POP 142 may select a single remote session browsing configuration for a set of network content. For example, the NCC POP 142 may select a single remote session browsing configuration for a requested network resource such as a Web page. The NCC POP 142 may thus process the Web page together with all embedded content based on the selected remote browsing session protocol, and utilize the remote browsing session protocol to exchange user interaction data and updated browse session data for all embedded content associated with the Web page. In another embodiment, the NCC POP 142 may select different remote session browsing configurations for one or more resources in a set of network content. For example, a network resource such as a Web page may reference processing intensive embedded Javascript or CSS resources, as well as embedded video resources. The NCC POP 142 may select a first remote session browsing configuration for the Web page and all embedded resources excluding the embedded video resource, and a second remote session browsing configuration for the embedded video resource. Illustratively, this may result in the NCC POP 142 utilizing RDP to send a processing result to the client computing device 102 for display of the Web page and associated embedded resources, while utilizing HTTP to send the embedded video as a separate, unprocessed file. In one embodiment, the client computing device 102 may perform the minimal processing required to display the RDP processing result corresponding to the Web page and embedded resources, and may also perform additional processing necessary to display the embedded video, for example, overlaying the video on top of the displayed RDP representation of the Web page. Any number of remote session browsing configurations may be selected to correspond to any number of resources or objects included in a set of network content, regardless of whether resources or objects are obtained from a content provider 104 or CDN service provider 106 in one or more logical files or data structures.

Although the selection of a remote session browsing configuration is illustratively depicted herein as occurring after all network resources and associated embedded content have been obtained by the NCC POP 142, one skilled in the relevant art will appreciate that the selection of a remote session browsing configuration may be performed at any time. For example, the NCC POP 142 may select a remote session browsing configuration after receiving a new browse session request or related information from the client computing device, may select a remote session browsing configuration after obtaining a network resource, but before obtaining any associated embedded resources, or at any other time. In some embodiments, the NCC POP 142 may switch to a new remote session browsing configuration at some time subsequent to the client computing device 102 obtaining an initial processing result. Illustratively, the NCC POP 142 selecting a new remote session browsing configuration may occur automatically after a certain time period or event or in response to a change in network conditions, NCC POP 142 or client computing device 102 load or computing resources, or any other factor described above as potentially influencing the choice of remote session browsing configuration. Illustratively, an NCC POP 142 dealing with other types or formats of information may select a remote session protocol based on any number of similar factors. For example, one of skill in the relevant art will appreciate that a similar schema may be developed for the processing of images, video, audio, database information, 3d design data, or any other file format or type of data known in the art.

The client computing device 102 may, in various embodiments, further instantiate a parallel browsing process sequentially or simultaneously with the request for a remote browse session. In one embodiment, a client computing device 102 may instantiate a traditional local browse session as known in the art (e.g., providing content requests from the browser and processing obtained resources locally) in addition to one or more remote browse instances executing at an NCC POP 142. In another embodiment, a client computing device 102 may be provided with unprocessed network resources by the NCC POP 142. Illustratively, the network resources may have been retrieved from one or more content providers, CDNs, or cache components by the NCC POP 142. The resources may be provided to the client computing device 102 to process locally in parallel with the remote browse instance executing at the NCC POP 142. In still further embodiments, the network computing and storage provider or NCC POP 142 may instantiate any number of new virtual machine instances and/or browser instances (or make use of existing instantiated instances) to process resources and/or send processing results to the client computing device 102 in parallel. Illustratively, the local browse session at the client computing device 102 and the remote browse session instance at the NCC POP 142 may execute in parallel.

In one embodiment, a local browse session executing at the client computing device 102 may obtain unprocessed content (e.g., html Web pages, embedded content, and other network resources) from the NCC POP 142 responsive to a browse session request. Illustratively, the content may have been retrieved by the NCC POP 142 from a content provider, CDN, or cache in response to the browse session request. The unprocessed content provided by the NCC POP 142 may include all the content associated with the browse session request or may supplement content existing in a cache of the client computing device, retrieved from a content provider or CDN, or obtained from some other source. In one embodiment, a client computing device 102 may obtain all requested content from a local cache, and may not obtain any unprocessed resources or content from the NCC POP 142. Subsequent to obtaining the unprocessed content, client computing device 102 may process the requested content in parallel with a remote browse session executing at the NCC POP 142. For example, as the local browse session executing at the client computing device 102 is processing the requested content, a remote browse session executing at the NCC POP 142 may be processing the same content at substantially the same time. Once the NCC POP 142 has performed a set of processing actions on the content to generate a processing result (e.g., as specified by a determined remote session browsing configuration), the NCC POP 142 may provide the processing result to the client computing device 102.

For the purpose of illustration, a client computing device 102 may require a longer load time to obtain and process requested network resources than a browse session instance running at the NCC POP 142. For example, the NCC POP 142 may obtain and process content quickly due to its position on the network and the relative processing power of the local client computing device as compared to the NCC POP 142. Even if the NCC POP 142 provides the client computing device 102 with all requested network content, the client computing device 102 may still obtain a processing result from NCC POP 142 before the local browse session has fully completed processing the requested resources. The client computing device 102 may complete any further processing steps and display the obtained processing result before completing local processing and display of the content. Illustratively, this may allow the client computing device 102 to take advantage of an NCC POP 142's quicker content load time relative to a traditional local browse session. Prior to the local browse session completing the processing all requested resources, the browser may process any user interactions locally and/or remotely as described in FIGS. 5 and 11 below.

Once the local browse session has fully obtained and processed resources corresponding to the requested content, the computing device 102 may determine whether to continue to display results obtained from the NCC POP 142 (and process user interactions at the NCC POP 142) using the determined remote session browsing configuration or switch to processing user interactions locally. Switching to process user interactions locally may include replacing a displayed representation of the requested resources based on a processing result obtained from the NCC POP 142 with a local display of the requested resources. For example, a browser may display a representation of a Web page corresponding to a processing result from the NCC POP 142 (e.g., RDP display information representing the rendered page) until the browser is finished processing and rendering the Web page locally. The browser may then replace the representation from the NCC POP 142 with the locally rendered representation of the Web page. Illustratively, replacing one representation with another representation may be transparent to the user. For example, the local and NCC POP 142 representations of the Web page may be identical or substantially identical. In one embodiment, when the NCC POP 142 representation of the web page is displayed, the browser may send various user interactions with the displayed page to the NCC POP 142 for processing. When the locally rendered version of the Web page is displayed, user interactions may be processed locally at the browser. Illustratively, the determination of which representation of the requested resources to display (e.g., local or from the NCC POP 142) may be based on any of the same factors described with reference to determining a remote session browse protocol in above.

In one embodiment, the client computing device 102 may switch to processing user interactions locally as soon as local resources are fully loaded. Illustratively, the remote browse session instance running at the NCC POP 142 may be terminated after switching to local processing, or the remote browse session instance may be maintained as a backup in case of unresponsiveness or a failure with regards to the local browse session. For example, the client computing device 102 may process user interactions locally, as well as sending remote user interaction data to the NCC POP 142 in accordance with the selected remote session browsing configuration. The remote user interaction data may be used by the NCC POP 142 to keep the remote browse session instance fully in parallel with the local browse process being executed by the browser at the client computing device 102. As long as the local browse session continues to handle user interactions, the NCC POP 142 may either refrain from sending updated processing results, or may send updated processing results ignored by the client computing device 102. If a problem develops with the local browse session at the client computing device 102, updated processing results may be provided to the client computing device 102 from the NCC POP 142 for processing and display in lieu of the local browse session. Illustratively, this switch from the local browse session to remote processing may be transparent to the user. In some embodiments, the client computing device 102 may switch from a local browse session to a remote browse session instance based on factors other than unresponsiveness or failure at the local browser. For example, the client computing device 102 or network computing and storage component 107 may select between a remote and local browse session based on any of the factors enumerated with regards to determining a remote session browse protocol above In another embodiment, the client computing device 102 may continue to process and display updated processing results from the NCC POP 142 even after the local browse session has fully loaded the requested content. The client computing device 102 may terminate the local browse session or may run the local browse session in parallel as a backup process in the converse of the example provided above. It should be appreciated that although the local browse session is described here for the purpose of illustration as being slower to load than the remote browse session instance, in some embodiments the local browse session may load the content faster than the remote browsing session, in which case the browser may process user interactions locally until the remote browse process has fully loaded the requested content. In some embodiments, the client computing device 102 may display and process user interactions through whichever browse session, local or remote, loads the requested content first.

In various other embodiments, the network computing and storage provider 107 may instantiate multiple remote browse session instances to run in parallel in addition to or as an alternative to instantiating a local browse session. Illustratively, these parallel browse session instances may utilize any of the same or different remote session browse protocols, and may act as backups in the manner described above with regard to a local browse session, or may be used and switched between as alternatives in order to maximize browser performance at the client computing device 102. For example, in response to one or more browse session requests, the network computing and storage provider 107 may instantiate a browse session instance running on a first NCC POP and utilizing an RDP protocol as well as browse session instance running on a second NCC POP utilizing an X-Windows protocol. The client computing device 102 or the network computing and storage provider 107 may determine which browse session instance and protocol should be used based on performance or resource usage considerations as described with regards to determining a remote session browse protocol above.

With continued reference to FIG. 9, at block 918, the network computing and storage provider 107 may process the obtained content, including the one or more requested network resources and embedded network resources, according to the determined remote session browsing configuration to generate an initial processing result. At block 920, the network computing and storage provider 107 may provide the initial processing result to the client for further processing and display in the content display area of the browser. For the purposes of further example, an illustrative client new browse session interaction routine 1000 implemented by client computing device 102 is described below with reference to FIG. 10. At block 922, the start new browse session routine 900 ends.

Figure 10:
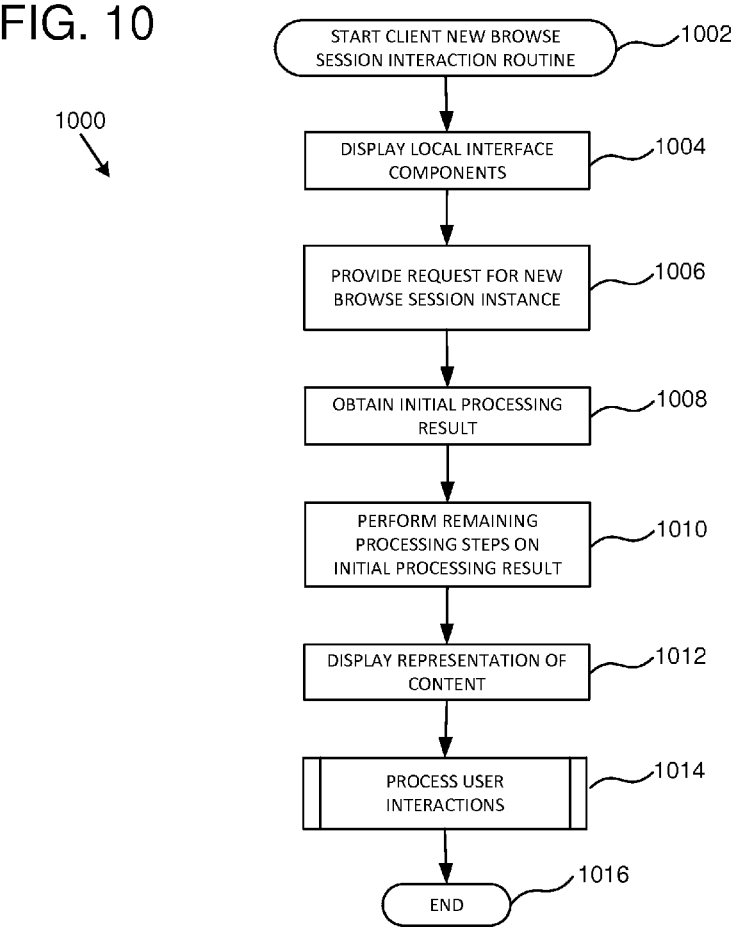
FIG. 10 is a flow diagram illustrative of a client new browse session interaction routine implemented by a client computing device.

FIG. 10 is a flow diagram illustrative of a client new browse session interaction routine 1000 implemented by client computing device 102. New browse session interaction routine 1000 begins at block 1002 in response to an event or user request causing the client computing device 102 to load a browser for viewing network content. At block 1004, the client computing device loads locally managed components of the browser, including all local interface components. As described above with reference to FIGS. 5 and 7, local interface components may include toolbars, menus, buttons, or other user interface controls managed and controlled by the software browser application or any other process executing or implemented locally at the client computing device. At block 1006, the client computing device 102 provides a request for a new browse session instance to the network computing and storage provider 107. From the perspective of the user of the client computing device, the request for the new browse session corresponds to the intended request to transmit the request to one or more corresponding content providers 104. In other embodiment, the new session request may correspond to a request to load a file or other document (e.g., a request to load an image in a photo-editing application, etc.). Illustratively, the request may be generated automatically as a result of the browser loading (e.g., a request for a default or "home" page), or may be generated as a result of a user following a link or entering a network address into an address bar. As illustrated with respect to FIG. 2, the browse session request is transmitted first to a network computing and storage provider 107. In an illustrative embodiment, the network computing and storage provider 107 utilizes a registration API to accept browse session requests from the client computing device 102.

A browse session request may include any number of pieces of data or information including, but not limited to, information associated with a user, information associated with the client computing device 102 or software on the client computing device (e.g., hardware or software information, a device physical or logical location, etc.), information associated with the network 108, user or browser preferences (e.g., a requested remote session browse protocol, a preference list, a decision tree, or other information), information associated with the network computing and storage provider 107, information associated with one or more pieces of requested network content (e.g., the network address of a network resource), etc. For example, a browse session request from the client computing device 102 may include information identifying a particular client computing device hardware specification or a hardware performance level, latency and bandwidth data associated with recent content requests, a desired security level for processing different types of content, a predetermined preference list of remote session browse protocols, and one or more network addresses corresponding to requested network resources, among others. In another example, the browse session request can include information identifying a client computing device 102 screen resolution, aspect ratio, or browser display area in the browse session request may allow the network computing and storage provider 107 to customize the processing of network content for display on the client computing device. As previously described, the browse session request can include network address information corresponding to a requested network resource, which may be in any form including, but not limited to, an Internet Protocol ("IP") address, a URL, a Media Access Control ("MAC") address, etc. In one embodiment, the request for a new browse session instance may correspond to the network computing and storage provider receiving a request for a new browse session instance at block 904 of FIG. 9 above.

At block 1008, the client computing device 102 obtains an initial processing result from the network computing and storage provider 107. Illustratively, the format and data included in the initial processing result may vary based on the remote session browsing configuration selected by the network computing and storage provider 107. In one embodiment, the initial processing result may include or be preceded by data informing the client computing device 102 of the choice of remote session browsing configuration and/or establishing a connection over the remote session communication protocol corresponding to the selected remote session browsing configuration. As discussed above with reference to FIGS. 8 and 9, the obtained initial processing result may include requested content with one or more processing actions performed by the network computing and storage provider 107. Subsequent to obtaining the initial processing result, the client computing device 102 may perform any remaining processing actions on the initial processing result at block 1010.

At block 1012, the client computing device 102 displays the content corresponding to the processed initial processing result. For example, the client computing device 102 may display the processed client in the content display area 702 of a browser 700 as described in FIG. 7 above. In one embodiment, the processing result may only include display data corresponding to content displayed by a browser, and may not include display data corresponding to, for example, the interface controls of a browser instance at the NCC POP 142, the desktop of a virtual machine instance corresponding to the browse session, or any other user interface of the NCC POP 142. For example, the NCC POP 142 may process a Web page and associated content for display via RDP in a browser instance running in a virtual machine instance at the NCC POP 142. The browser instance may have one or more interface elements such as toolbars, menus, scroll bars, etc., in addition to the displayed Web page. The NCC POP 142 may send an RDP processing result corresponding to the displayed Web page only, without any of the interface elements associated with the browser. Illustratively, including an RDP processing result corresponding to the displayed Web page only may allow the browser at the client computing instance 102 to display the Web page by assembling the RDP processing result in the content display area of the browser without any further processing. In another embodiment, the RDP processing result may include a full virtual machine desktop and browser window corresponding to the full interface displayed at the NCC POP 142 browse session instance. The client computing device may automatically identify the area of the RDP processing result corresponding to the requested content, and may display only this area in the content display area of the browser.

At block 1014, the client computing device 102 processes local and remote user interactions. An illustrative routine for processing user interactions is provided below with reference to FIG. 11. At block 1016 the routine ends. Illustratively, a browse session instance instantiated by the network computing content provider 107 may terminate when a browser window or content display area is closed, may terminate when a remote session browse protocol is replaced by a parallel process at the client computing device 102, or may terminate in accordance with a timer or other event. Illustratively, if a browse session has terminated automatically due to a time-out but has associated content still displayed in a browser at the client computing device 102, later attempts by the user to interact with the content may result in a new browse session request being provided to the network computing and storage service provider 107 to start a new browse session according to the last state of the terminated session. Illustratively, terminating a remote browse session after a time-out may allow the network computing storage provider 107 to save computing resources at the NCC POP. In one embodiment, this process may be transparent to the user at client computing device 102, even though the remote browse session has been terminated during the intervening period.

Figure 11:
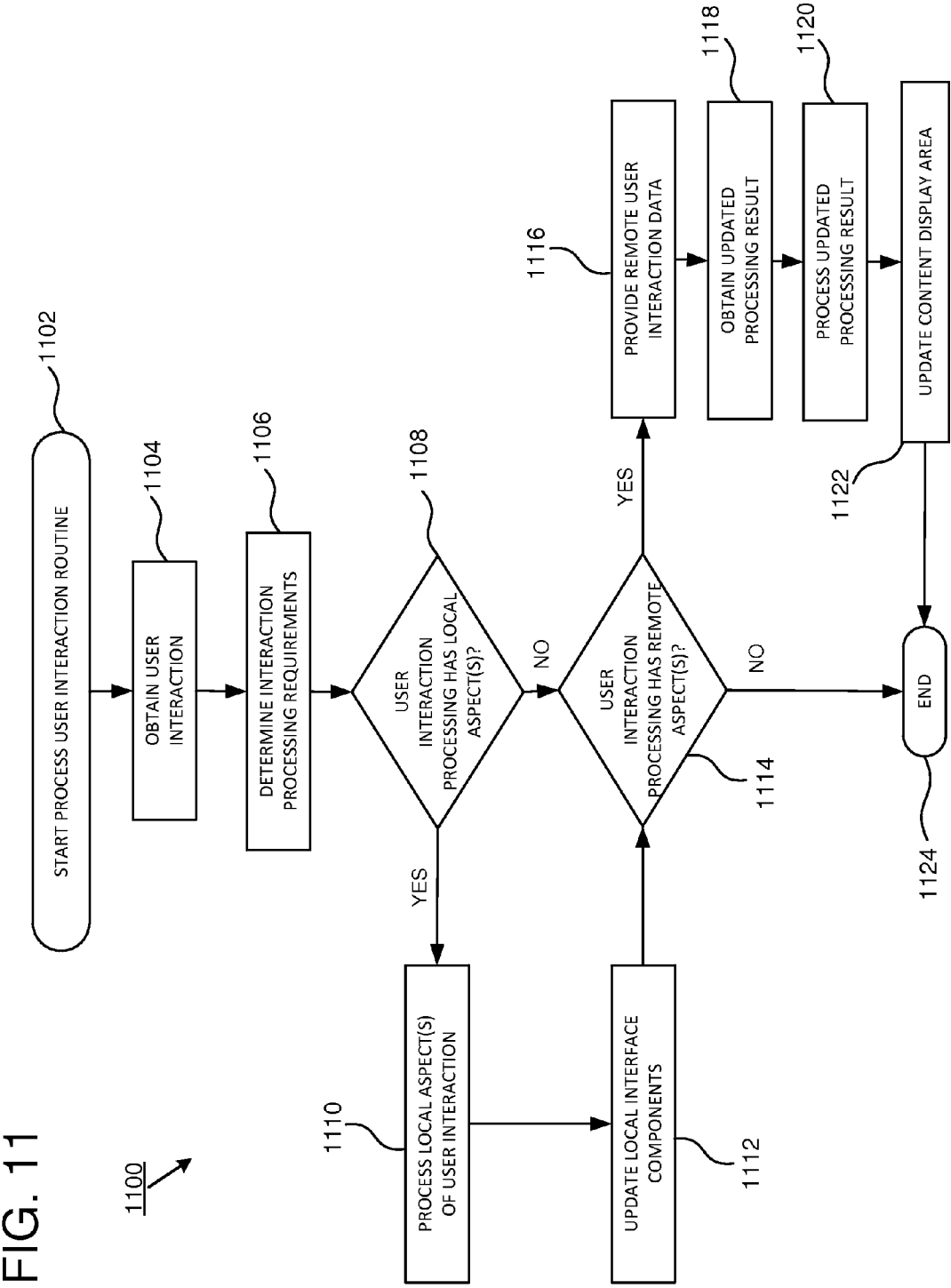
FIG. 11 is a flow diagram illustrative of a process user interaction routine implemented by a client computing device.

FIG. 11 is a flow diagram illustrative of a process user interaction routine 1100 implemented by a client computing device 102. Process user interaction routine 1100 begins at block 1102 in response to an interaction by a user. Illustratively, process user interaction routine 1100 may begin subsequent to the display of content in a content display area of a browser interface. For example, process user interaction routine 1100 may correspond to block 1014 of FIG. 10 above.

Illustratively, the displayed content may have one or more interactive elements, such as forms, buttons, animations, etc. User interaction with these interactive elements may require processing and display of updated content in the content display area. For example, selecting an element in a drop-down menu on a Web page may require processing and may change the configuration or visual appearance of the Web page or embedded resources. Illustratively, the processing required by user interaction with the displayed content may be handled as a local user interaction at the client computing device 102 or as a remote user interaction at the NCC POP 142 depending on the remote session browsing configuration in use. For example, if a remote session browsing configuration utilizing substantial local processing (e.g., sending unprocessed files over HTML), user interactions with displayed content may typically be handled as local user interactions at the client computing device 102. Illustratively, handling user interactions with displayed content as local user interactions at the client computing device 102 may allow for better responsiveness and fewer delays with simple user interactions (e.g., selection of a radio button, or typing text into a field), as interaction data corresponding to the interaction does not need to be sent to the NCC POP 142 for processing.

As a further example, if a remote session browsing configuration utilizing heavy remote processing of content (e.g., sending processed bitmap data over RDP) is being used as the remote session browsing configuration, all user interactions with displayed content may be handled as remote user interactions. For example, user input (e.g., keyboard inputs and cursor positions) may be encapsulated in RDP protocol data units and transmitted across network 108 to the NCC POP 142 for processing. Illustratively, the NCC POP 142 may apply the user interactions to the network content and transmit processing results consisting of updated bitmaps and interface data corresponding to an updated representation of the content back to the client computing device 102. Illustratively, handling user interactions with displayed content as remote user interactions at the NCC POP 142 may have a negative impact on interface responsiveness, as data is required to pass over the network and is limited by network latency; however, user interactions that require a substantial amount of processing may perform better when handled as remote user interactions, as the processing latency of the NCC POP 142 may be substantially lower than the processing latency of the client computing device 102.

In addition to a content display area for displaying network content, a browser may have one or more local interface components, such as toolbars, menus, buttons, or other user interface controls. Interactions with local interface components may be treated as local user interactions or remote user interactions depending on the processing required by the interaction and the remote session browsing configuration as further depicted in illustrative FIG. 7. For example, some local interface components may be managed locally by browser code running on the client computing device, while other local interface components may have one or more locally managed aspects (e.g., button click feedback, scroll bar redraw, etc), and one or more remote managed aspects treated as remote user interactions (e.g., page refresh, requesting a page at an address in an address bar, etc.)

At block 1104, the client computing device 102 obtains a user interaction from the user. This user interaction may be an interaction with local interface components as described in FIG. 7 and above, or may be an interaction with any interactive elements of the content displayed in the content display area of the browser, such as form fields, buttons, animations, etc. User interaction with these local interface components or interactive elements of displayed content may require local and/or remote processing depending on the nature of the component or element and the processing split specified by the remote session browsing configuration as described in FIG. 7 and above. At block 1106, the client computing device 102 determines the interaction processing requirements for the obtained user interaction. At decision block 1108, if the user interaction has local aspects (e.g., button click feedback, a change to a local browser state, a content element being processed at the client computing device, etc.) the routine 1102 moves to block 1110 to process the local aspect or aspects of the user interaction at the client computing device 102 and subsequently update the local interface components at block 1112. Illustratively, and as discussed above, aspects of the interaction and updating interface components and elements locally allows a browser to provide responsive user interfaces and content. Subsequent to processing local aspect(s) of the user interaction, or if the user interaction has no local elements (e.g., a user interaction with a content element displayed in the content display area when using a remote session browsing configuration processing entirely on the server side and utilizing an RDP remote session communication protocol) the routine 1102 moves to decision block 1114. If the user interaction has remote aspects that require processing, the routine 1102 moves to block 1116 and provides remote user interaction data to the network computing and storage provider 107. Illustratively, in the case of a heavily server side remote session browsing configuration utilizing an RDP remote session communication protocol, the remote user interaction data may include input data such as a cursor position or keyboard input encapsulated in one or more RDP protocol data units. In some embodiments of remote session browsing configurations utilizing RDP or other remote session communication protocols, particular aspects of remote user interaction data such as cursor positions may be provided to the network computing and storage provider 107 on a continuous basis, while in other embodiments of remote session browse configurations remote user interaction data may only be provided to the network computing and storage provider 107 when associated with a user interaction that requires remote processing.

At block 1118, the client computing device 102 obtains an updated processing result from the network computing and storage provider 107, the network computing and storage provider 107 having processed the remote user interaction data to generate an updated representation of the content. At block 1120, the client computing device 102 performs any additional processing required on the updated processing result (based on the remote session browsing configuration) and at block 1122 displays the updated processing result in the content display area of the browser. At block 1124 the process user interaction routine 1102 ends. Illustratively, the routine may be executed again any number of times in response to further user interactions with the browser and displayed content.

In some embodiments, technologies are provided for implementing a cloud browse environment in which a server environment implements a cloud browser (e.g., a headless browser) that outputs layers for sending to a Document Object Model (DOM) based web browsing client that uses the layers for creating a simplified DOM. For example, a cloud browser can be provided in which a server environment obtains web page content (e.g., HTML and associated web page resources) for a requested web page, creates a DOM from the obtained content, and then creates layers (e.g., a processed layer tree) from the DOM. The server environment can send the layers to a client (e.g., a client computing device running a web browser application). The client can create a simplified DOM from the received layers and display the web page using the simplified DOM. For example, the client can run a web browser application that displays the web page using the simplified DOM. In some embodiments, the headless browser and the client communicate via a network connection that does not use the HTTP network protocol (e.g., a non-HTTP network connection).

Figure 12:
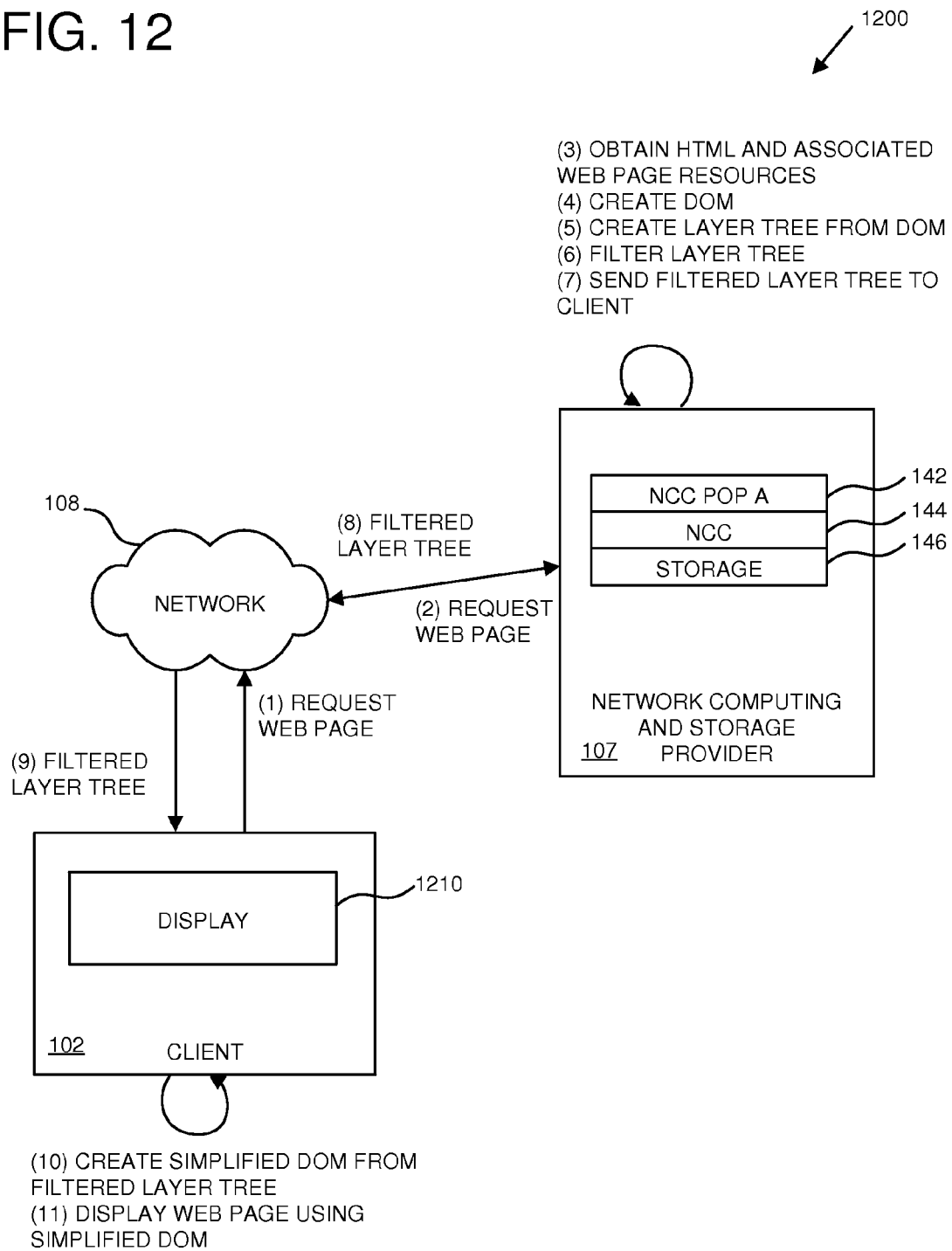
FIG. 12 is a block diagram of the content delivery environment of FIG. 1 in which a cloud browse environment is implemented.

With reference now to FIG. 12, the interaction between various components of the networked computing environment 100 of FIG. 1 will be discussed in the context of a cloud browse environment with a DOM-based client browser.

FIG. 12 is a block diagram 1200 of the content delivery environment of FIG. 1 within which a cloud browse environment is implemented. As depicted in the diagram 1200, a client computing device 102 can communicate with network computing and storage provider 107 via the network 108. Specifically, the client computing device 102 can perform web browsing activities in association with the network computing and storage provider 107. While only one client computing device 102 is depicted, the environment supports multiple client computing devices.

In some embodiments, the client computing device 102 sends a request for a web page to the network computing and storage provider 107. For example, a user of the client computing device 102 may enter a web page address in a URL field of a web browser application running on the client computing device 102. The network computing and storage provider 107 obtains HTML and associated web page resources (e.g., images, CSS information, JavaScript code, video content, and/or other web page resources) for the web page. The HTML and associated web page resources may be obtained from local storage (e.g., local storage 146, which may include cached resources) and/or from other sources (e.g., from web servers and/or content providers). The network computing and storage provider 107 creates a DOM (also called an original DOM) from the obtained HTML and associated web page resources. In some implementations, the DOM created by the network computing and storage provider 107 is a full DOM that would typically be created by a web browser application. The network computing and storage provider 107 then creates a layer tree (e.g., a processed layer tree, which could be a tree of composited layers, a tree of render layers, or layers at another level of processing). In some embodiments, the network computing and storage provider 107 performs filtering on the layer tree. For example, the layer tree may be filtered to remove layers that are not needed by the client and/or to remove properties that are not needed by the client. The network computing and storage provider 107 sends the layer tree, which may be a filtered or an unfiltered layer tree, to the client computing device 102.

The client computing device 102 receives the layer tree from the network computing and storage provider 107. The client computing device 102 creates a simplified DOM from the layer tree. Creating the simplified DOM can comprise creating DOM nodes representing the layers of the layer tree and setting properties of the DOM nodes according to properties of corresponding layers of the layer tree. The client computing device 102 displays the web page using the simplified DOM on the display 1210. For example, the client computing device 102 can provide the simplified DOM to a web browser application running on the client computing device 102 to display the web page. In some implementations, the web browser application is a standard web browser application that does not need to be modified to display the web page using the simplified DOM. Stated another way, the simplified DOM can be created to comply with a DOM standard or specification that can be utilized by a web browser application configured to support the DOM standard or specification.

Figure 13:
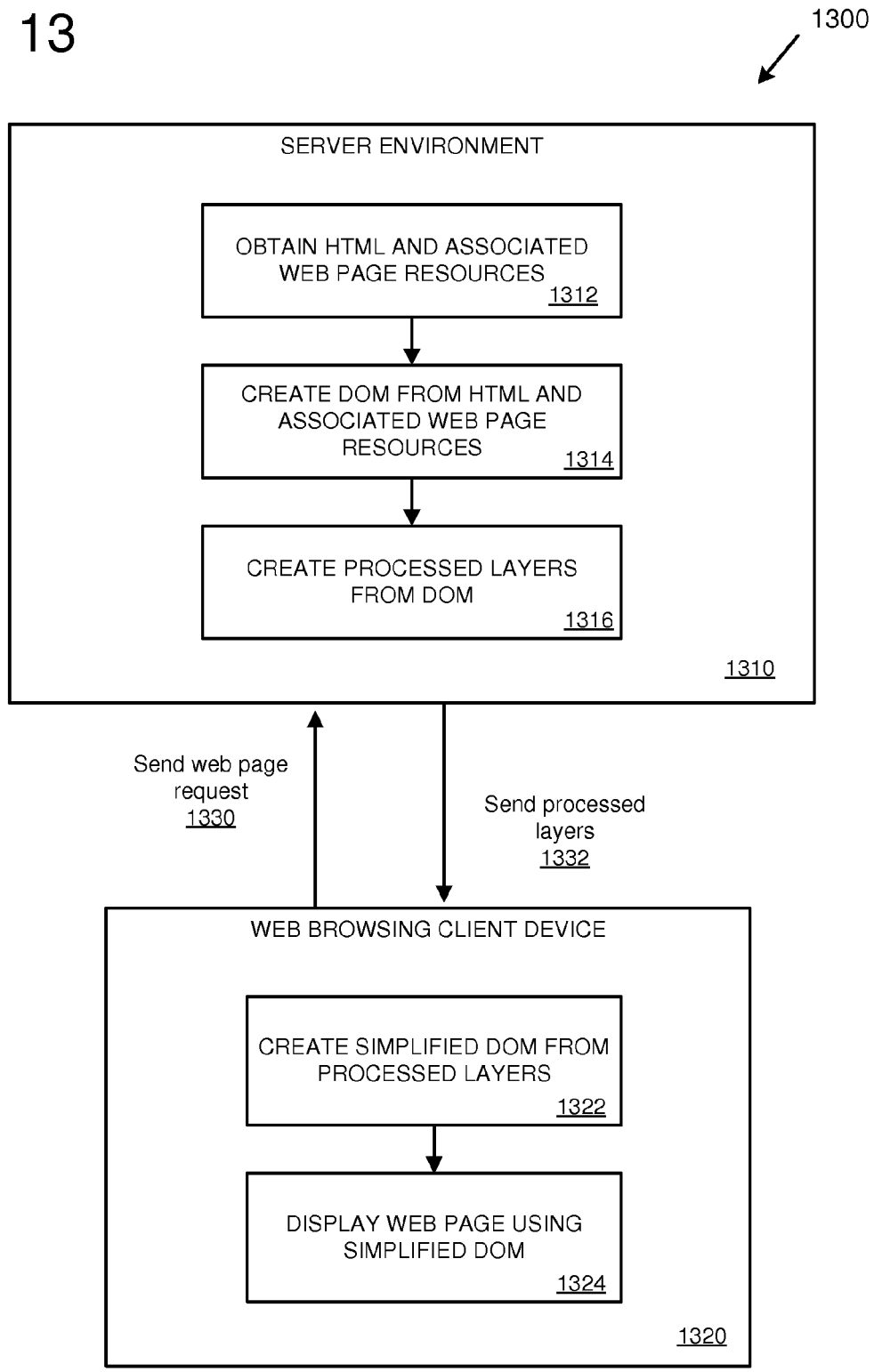
FIG. 13 is a block diagram depicting an example environment in which a cloud browse environment is implemented.

FIG. 13 is a block diagram 1300 of an example environment in which a cloud browse service is provided. The example environment includes a server environment 1310

(e.g., a cloud-based or network-based web browsing environment operated by one or more computer servers, such as a network computing provider or a network computing and storage provider). The server environment 1310 can provide content browsing services to client devices, including client device 1320. For example, the server environment 1310 can participate in browsing of web pages that contain various types of content, such as social media content, audio content, video content, and/or other types of content.

As depicted in the block diagram 1300, the server environment 1310 obtains HTML and associated web page resources for a web page, as depicted at 1312. For example, the server environment 1310 can receive a request for the web page from the client device 1320, as indicated at 1330. The request can be an initial request for the web page or it can be a subsequent request for the web page (e.g., to update the web page due to interaction by the user at the client device). The server environment 1310 creates a DOM (also called an original DOM) from the obtained HTML and associated web page resources. In some implementations, the DOM created by the server environment 1310 is a full DOM that would typically be created by a web browser application. The server environment 1310 creates processed layers from the DOM. For example, the server environment 1310 can create a processed layer tree comprising composited layers, render layers, or layers at another level of processing. The server environment 1310 sends the processed layers (e.g., as a processed layer tree) to the client device 1320, as indicated at 1332. In some embodiments, the server environment 1310 filters the processed layers to create filtered processed layers, which are then sent to the client device 1320.

The client device 1320 creates a simplified DOM from the processed layers received from the server environment 1320, as depicted at 1322. Creating the simplified DOM can comprise creating DOM nodes representing the processed layers (e.g., image-type DOM nodes that contain image content from the processed layers) and setting properties of the DOM nodes according to properties of corresponding processed layers. The client device 1320 displays the web page using the simplified DOM, as depicted at 1324. For example, the client device 1320 can provide the simplified DOM to a web browser application running on the client device 1320 to display the web page. In some implementations, the web browser application is a standard web browser application that does not need to be modified to display the web page using the simplified DOM. Stated another way, the simplified DOM can be created to comply with a DOM standard or specification that can be utilized by a web browser application configured to support the DOM standard or specification.

In some embodiments, the simplified DOM nodes are image-type DOM nodes that comprise image content in an image format (e.g., a natively-supported image format and/or a custom image format). For example, the layers can comprise image content (e.g., content in an image format that is a graphical representation of a portion of a web page). The image content can be in a format that is natively supported by the layers and/or by the DOM (e.g., JPEG, PNG, etc.). The image format can also be a custom image format that is not natively supported (e.g., a custom vector graphics image format such as the Skia image format; Skia is an open source 2D graphics library). In some embodiments, the server and client can negotiate which image format will be used (e.g., which image format will be used by the server when providing the layers to the client). For example, if the client supports a custom image format, then the server can create the layers with image content in the custom image format (e.g., if the client supports Skia, then the server can create layers with content in the Skia format, and otherwise can create layers with a natively-supported image format such as JPEG or PNG).

In some embodiments, creating the simplified DOM (e.g., as depicted at 1322) comprises setting properties for one or more of the DOM nodes of the simplified DOM. The properties can include x,y positioning properties, relative-absolute positioning properties, opacity properties, ordering properties (e.g., specifying z-ordering), video-specific properties (e.g., source URL, size, and/or other video properties), audio-specific properties, content type properties (e.g., image, video, audio, etc.), and/or other properties.

In some embodiments, one or more simplified DOM nodes are created (e.g., as depicted at 1322) for one or more corresponding layers (e.g., one or more corresponding composited layers of a composited layer tree). For example, each of the simplified DOM nodes can be create by creating a DOM node representing the corresponding layer, obtaining properties for the composited layer (e.g., position, opacity, ordering, etc.), and setting properties for the DOM node based on the properties obtained for the composited layer. For example, the properties for the DOM node can include CSS properties that are created from meta-data properties of the layers (e.g., position and location properties for a layer can be translated into corresponding DOM node properties, such as CSS position, ordering, and transparency properties).

In some embodiments, the client (e.g., client device 1320) supports a browser as a service. For example, the client can load a web page (e.g., provided by the server environment 1310) comprising JavaScript code for creating a simplified DOM and displaying a web page using the simplified DOM (e.g., for performing operations depicted at 1322 and/or 1324). For example, the JavaScript code can run within a web browser application that has not been modified to support creation of a simplified DOM (e.g., to provide the browser as a service to web browsers that support JavaScript). Instead of, or in addition to, JavaScript, other web browser components can be used to implement a browser as a service (e.g., a web browser component such as a web browser plug-in, web browser extension component, or custom web browser code).

In some embodiments, the server environment 1310 performs different types or levels of processing for different portions of the web page content. For example, the server environment 1310 may perform the depicted operations (1312, 1314, and 1316) for a first portion of the web page content while performing less processing (e.g., only 1312 and 1314) on a second portion of the web page content. For example, the server environment 1310 may provide the second portion of the web page content in an original DOM format (e.g., with associated images, etc.) and send the second portion of the web page content to the client device 1320 for local rendering, which can support local interaction with the second portion of the web page content at the client device 1320 (e.g., without requiring a round-trip back to the server environment 1310).

In some embodiments, the simplified DOM created by the client (e.g., by client device 1320) may be replaced with a more complete DOM (e.g., over a period of time in the background). For example, the client may initially create a simplified DOM for a web page and display the web page using the simplified DOM. Using a simplified DOM initially can provide a fast page load. Once the web page has been displayed using the simplified DOM, the client can receive a more complete DOM from the server (e.g., server environment 1310), such as an original DOM for the web page. The client can also receive associated content and/or state information for the more complete DOM (e.g., associated web page resources such as images, JavaScript virtual machine state information, etc.) The client can then switch to the more complete DOM for displaying the web page. Switching to a more complete DOM can allow the client to display the web page independently (e.g., without further server interaction) and support local interaction with the web page. In addition, the server environment only needs to load the web page once (e.g., the server environment can use the original DOM created at 1314 for creating the processed layers and for sending to the client device).

In some embodiments, the client (e.g., the client device, web browser application, etc.) provides capability information to the server (e.g., along with the web page request 1330). For example, the client can send data representing hardware and/or software capabilities of the client (e.g., screen size or resolution, network connection information, browser capabilities, supported HTML5 features, and/or other hardware or software capabilities or settings). The server (e.g., server environment 1310) can use the received capabilities when retrieving the HTML and associated web page resources, when creating the original DOM, and/or when creating the processed layers (e.g., so that the processed layers are usable by, or compatible with, the client device hardware and/or software). For example, the server can render the requested web page according to the client capabilities so that the client will display the web page properly.

Figure 14:
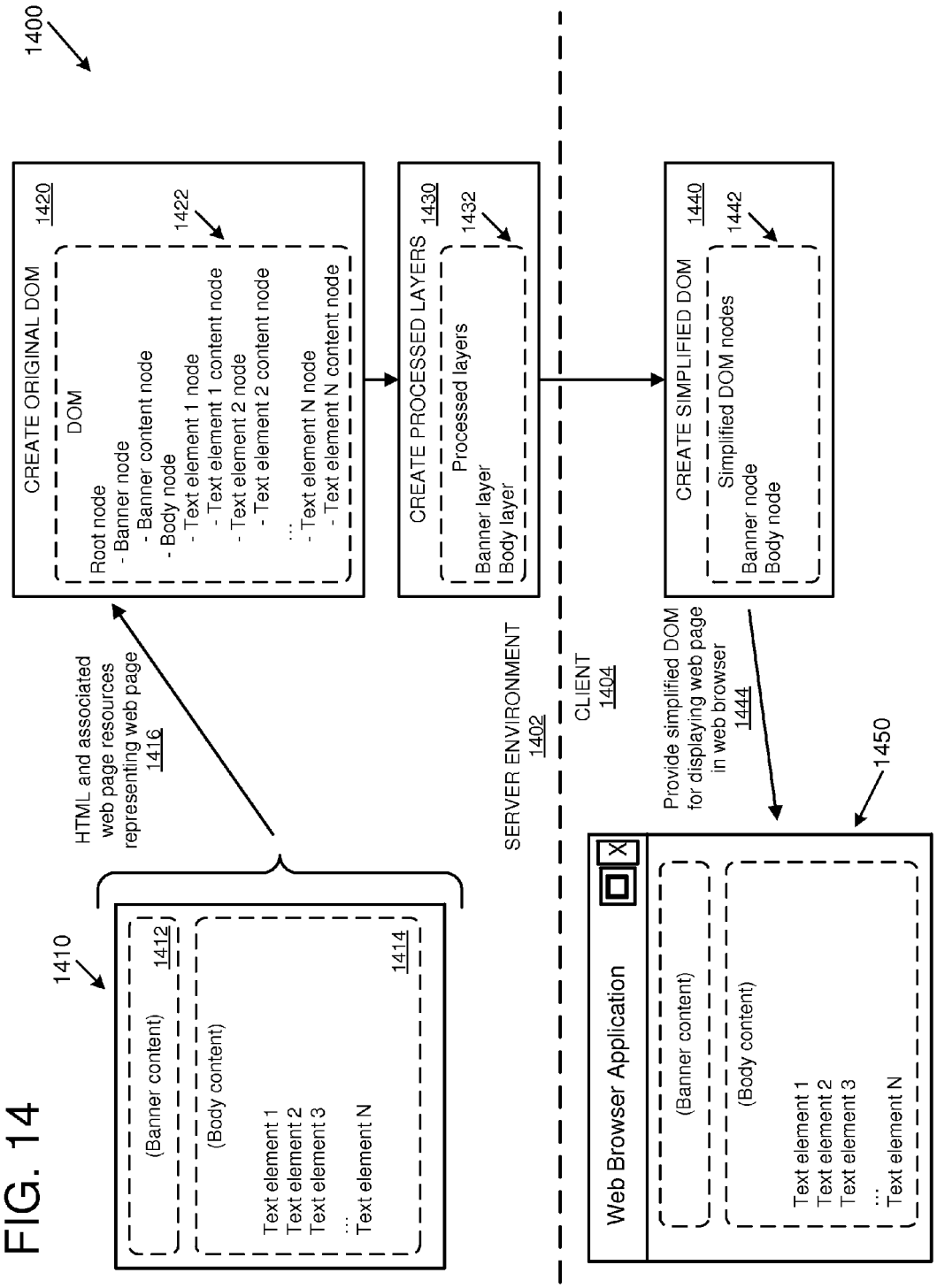
FIG. 14 is a diagram depicting an example process for displaying a web page implemented by a client using a simplified Document Object Model (DOM).

FIG. 14 is a diagram depicting an example process 1400 for displaying a web page implemented by a client using a simplified DOM. The process begins by the server environment 1402 receiving HTML and associated web page resources representing a web page, as indicated at 1416. The server environment 1402 can identify the web page by receiving a request for the web page from the client 1404 (e.g., a client computing device running a web browser application). The server environment 1402 can receive the HTML and associated web page resources (as indicated at 1416) from local storage (e.g., local cache) and/or from other sources, such as web servers or content providers.

The layout of the web page is depicted at 1410 to illustrate one example of how content of the web page can be used to create the various representations used by the server environment 1402 and the client 1404. As depicted at 1410, the web page in this example includes banner content 1412 (e.g., an image and/or text that remains at the top of the web page) and body content 1414 (e.g., images, text, and/or other content) which in this example includes a number of individual text elements 1 through N (e.g., each of the text elements could be a summary of a news article containing a link to the full article).

The server environment 1402 then creates an original DOM, depicted at 1420, from the received HTML and associated web page resources. An example DOM 1422 is depicted representing the specific content of the example web page 1410. Specifically, the example DOM 1422 includes a DOM nodes for the content of the web page 1410, including a root node, a banner node and a banner content node (representing the banner content 1412), and a body node with nodes for each individual text element (representing the body content 1414). As depicted, the example DOM 1422 is a full DOM that representing all of the content of the web page 1410. Depending on the amount, type, and complexity content in the web page, the original DOM may contain hundreds or thousands of nodes.

The server environment next creates processed layers, depicted at 1430, from the original DOM. Example processed layers are depicted at 1432 corresponding to the example DOM 1422. As depicted at 1432, the processed layers include two layers: a banner layer representing the banner content 1412 and a body layer representing the body content 1414. The server environment 1402 can create the processed layers 1430 by performing rendering pipeline operations to "flatten" the original DOM 1420 into a relatively small number of layers. For example, the two processed layers depicted at 1432 can be created from the original DOM depicted at 1422 which may have had hundreds of nodes.

In some embodiments, each of the processed layers created at 1430 comprises content and meta-data. The content can include image content (e.g., a graphical representing the web page content of the layer). The image content can be in an image format such as a native image format (e.g., PNG, GIF, JPEG, etc.) or a custom image format (e.g., a custom format, such as a vector graphics format, that may not be supported by all clients). The meta-data can include information such as position information (e.g., x/y position, relative or absolute position properties, etc.), opacity information, ordering information (e.g., ordering in front of, or behind, other layers), parent-child relationship information, and/or other types of meta-data. In some embodiments, the processed layers are composited layers.

The server environment 1402 sends the processed layers created at 1430 to the client 1404. For example, the server environment 1402 can send the processed layers to the client 1404 in response to receiving a request for the web page from the client 1404.

The client 1404 receives the processed layers and creates a simplified DOM, as depicted at 1440. The simplified DOM can comprise one or more image-type DOM nodes corresponding to the processed layers (e.g., an image-type DOM node for each processed layer). Other DOM nodes can be created as well, such as a root DOM node. In some embodiments, the simplified DOM is created by creating an image-type DOM node for each processed layer where the image-type DOM node contains the image content from its corresponding layer. The DOM nodes of the simplified DOM can also include properties created from the meta-data of the processed layers (e.g., DOM properties created from the meta-data, such as positioning information, opacity information, ordering information, etc.). For example, the example banner processed layer depicted at 1432 can have meta-data indicating that the banner processed layer remains at the top of the web page with other layers scrolling behind the banner layer. This meta-data can be used to create properties for the banner node depicted at 1442. For example, properties for the banner node can include a CSS fixed position property and/or a CSS z-index property.

An example simplified DOM is depicted 1442 that corresponds to the example processed layers depicted at 1432. The example simplified DOM contains two nodes, a banner node and a body node. For example the banner node can be an image-type DOM node that contains an image from the banner layer along with DOM properties created from the meta-data of the banner layer (e.g., position, ordering, etc.).

Once the client 1404 has created the simplified DOM, the client can display the web page using the simplified DOM. For example, the client 1404 can display the web page using the simplified DOM as indicated at 1444 using a web browser application. The displayed web page is depicted at 1450.

Using the cloud browsing techniques depicted in FIG. 14 can provide improvements in terms of web browsing speed and/or efficiency. For example, the server environment 1402, which may have more processing resources and/or a faster network connection, can obtain HTML and associated web page resources and render them down to create processed layers (e.g., composited layers or layers at another level of processing). This procedure can turn a complicated original DOM, which may contain hundreds or thousands of nodes, into processed layers where only a few layers needed to represent the entire original DOM. For example, the original DOM nodes can be grouped into content areas (e.g., similar to the banner content 1412 area and the body content 1414 area) from which corresponding layers can be created (e.g., containing content in an image format representing the content areas). The client 1404 can receive the processed layers and create a simplified DOM for display. Creating the simplified DOM using the processed layers can be much more efficient (e.g., use far fewer computing resources) than creating the original DOM.

Figure 15:
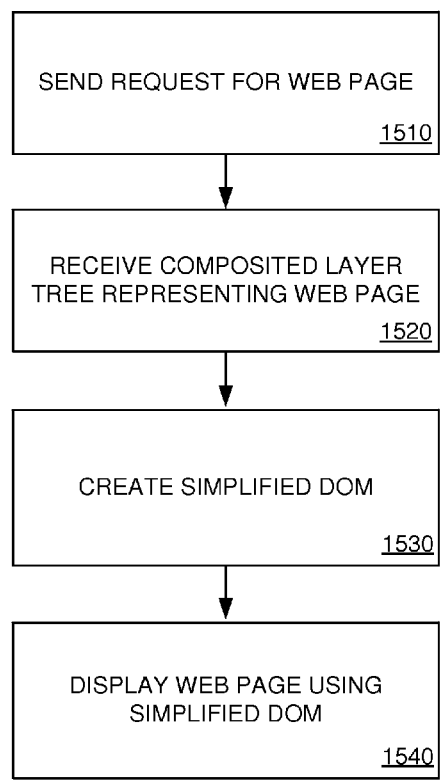
FIGS. 15 and 16 are flow charts of example methods for displaying web pages using a simplified DOM.

FIG. 15 is a flow chart of an example method 1500 for displaying a web page using a simplified DOM. For example, the example method 1500 can be performed by the client computing device 102 described above with regard to FIG. 12 or the client device 1320 described above with regard to FIG. 13.

At 1510, a request is sent for a web page. For example, the request can be sent in response to a user entering a web page URL, selecting a link on a web page, etc.

At 1520, a composited layer tree is received. The composited layer tree represents the web page (e.g., with layers containing graphical representations of portions of the web page). In some embodiments, the composited layer tree is created by a server environment that creates a DOM representing the web page (e.g., an original DOM) and then creates the composited layer tree from the DOM.

At 1530, a simplified DOM is created. The simplified DOM represents the composited layer tree (e.g., with DOM nodes of the simplified DOM corresponding to layers of the composited layer tree). In some embodiments, creating the simplified DOM comprises creating one or more DOM nodes corresponding to one or more layers of the composited layer tree and setting properties for the one or more DOM nodes based on properties of the one or more layers of the composited layer tree.

At 1540, the web page is displayed using the simplified DOM. For example, the simplified DOM can be displayed using a web browser application.

Figure 16:
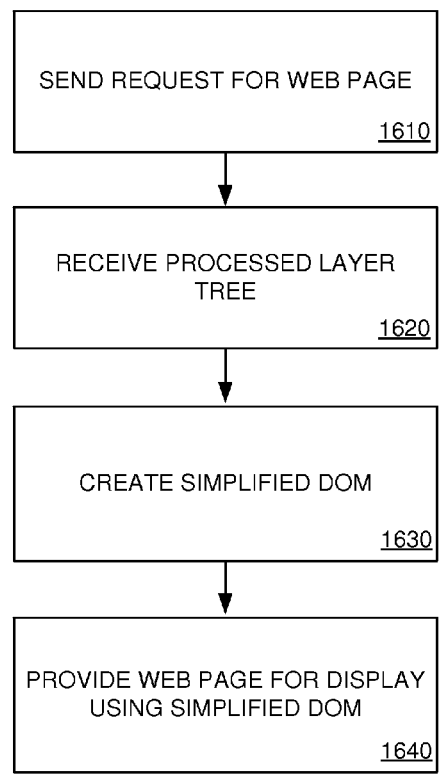

FIG. 16 is a flow chart of an example method 1600 for displaying a web page using a simplified DOM. For example, the example method 1600 can be performed by the client computing device 102 described above with regard to FIG. 12 or the client device 1320 described above with regard to FIG. 13.

At 1610, a request is sent for a web page. For example, the request can be sent in response to a user entering a web page URL, selecting a link on a web page, etc.

At 1620, a processed layer tree is received. The processed layer tree represents the web page (e.g., with layers containing graphical representations of portions of the web page). In some embodiments, the processed layer tree is created by a server environment that creates a DOM representing the web page (e.g., an original DOM) and then creates the processed layer tree from the DOM. The processed layer tree can comprise render layers, composited layers, and/or layers at another level of processing.

At 1630, a simplified DOM is created. The simplified DOM represents the processed layer tree (e.g., with DOM nodes of the simplified DOM corresponding to layers of the processed layer tree). In some embodiments, creating the simplified DOM comprises creating one or more DOM nodes corresponding to one or more layers of the processed layer tree and setting properties for the one or more DOM nodes based on properties of the one or more layers of the processed layer tree.

At 1640, the web page is provided for display using the simplified DOM. For example, the simplified DOM can be provided to a web browser application for displaying the web page.

Figure 17:
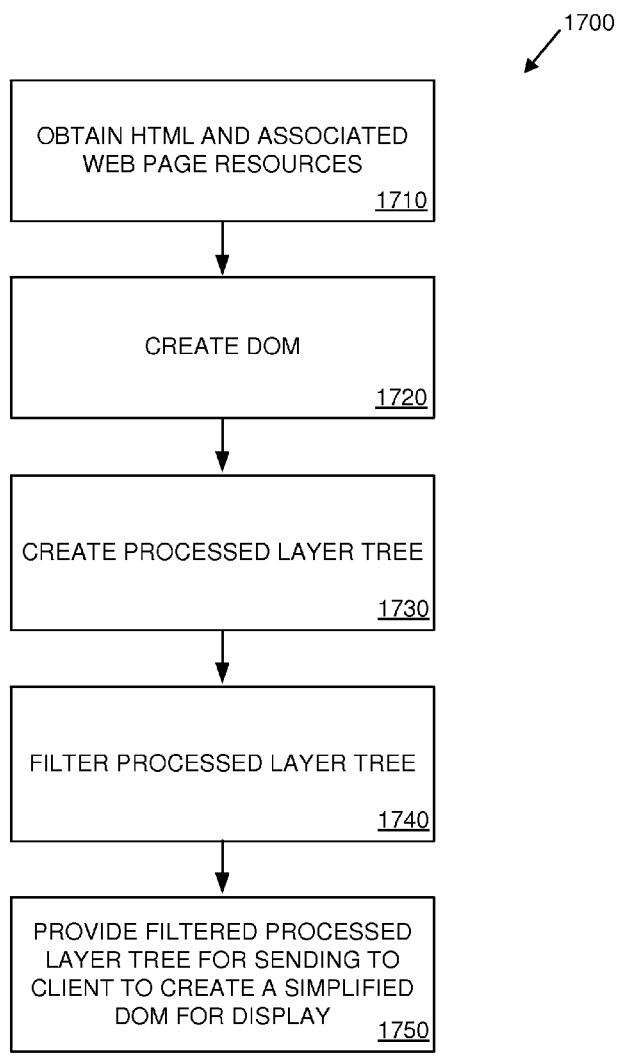
FIG. 17 is a flow chart of an example method for providing a cloud browser service.

FIG. 17 is a flow chart of an example method 1700 for providing a cloud browser service where a server environment creates an original DOM and processed layers (e.g., composited layers) for sending to a client that then creates a simplified DOM for display. For example, the example method 1700 can be performed by a network computing provider, by the network computing and storage provider 107 described above with regard to FIG. 12, or by the server environment 1310 described above with regard to FIG. 13.

At 1710, HTML and associated web page resources are obtained for a web page. The web page can be identified, for example, by a requested from a client (e.g., as part of a browse session).

At 1720, a DOM is created from the obtained HTML and associated web page resources. The DOM can be an original or "full" DOM that represents all of the content in the HTML and associated web page resources.

At 1730, a processed layer tree is created (e.g., a composited layer tree) from the DOM. The processed layer tree can represent a simplified version of the DOM in which nodes of the DOM are grouped into a relatively small number of layers (e.g., a fewer number of layers compared to the number of nodes in the DOM).

At 1740, the processed layer tree is filtered to create a filtered processed layer tree. Filtering the processed layer tree can comprise removing layers and/or removing properties. For example, the processed layer tree created at 1730 may have layers and/or properties that are not needed by the client when creating a simplified DOM or displaying the web page using the simplified DOM. Those layers and/or properties can be removed when filtering the processed layer tree. As an example, the processed layer tree created at 1730 may have layers such as scrollbar layers that are not needed by the client (e.g., because the client browser does not use scrollbars or does not use the type of scrollbars created by the server) and can therefore be removed. As another example, the filtering can comprise retaining those layers or properties that are needed by the client in order to create the simplified DOM and/or to display the web page (e.g., position properties, opacity properties, ordering properties, etc.). In some embodiments, the processed layer tree includes image content in a format supported by the client. For example, client support for various image formats can be determined and the processed layers can use one or more of the supported image formats.

At 1750, the filtered processed layer tree is provided for sending to a client. The client can create a simplified DOM from the processed layer tree and display the web page using the simplified DOM. The filtered processed layer tree can be encoded in a format (e.g., a key-value pair format) for sending to the client. The format can include information comprising: layer identification information (e.g., a unique identifier for each layer), layer relationship information (e.g., parent-child relationship information defining the layer tree structure), layer content information, and layer metadata information.

Figure 18:
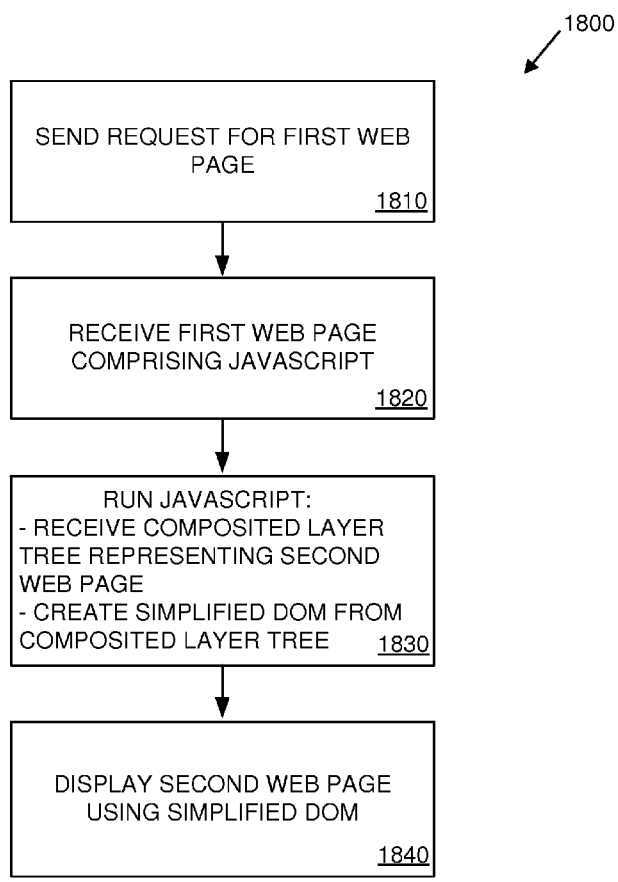
FIGS. 18 and 19 are flow charts of example methods for providing a browser as a service.

FIG. 18 is a flow chart of an example method 1800 for providing a browser as a service using JavaScript. For example, the example method 1800 can be performed by the client computing device 102 described above with regard to FIG. 12 or the client device 1320 described above with regard to FIG. 13.

At 1810, a request is sent for a first web page. For example, the request can be sent in response to a user entering a web page URL, selecting a link on a web page, etc. The first web page can be a page designed to start the browser as a service (e.g., to start a browse session using the browser as a service).

At 1820, the first web page is received. The first web page comprises JavaScript code (e.g., JavaScript embedded within the first web page and/or loaded from a separate file identified within the first web page). Upon receiving or "loading" the first web page, the JavaScript code can be executed by a computing device running a web browser application. In some implementations, any web browser application that supports JavaScript can receive the first web page and execute the JavaScript code.

At 1830, the JavaScript code is executed or "run" (e.g., within a web browser application) to perform operations for receiving a composited layer tree representing a second web page and for creating a simplified DOM from the composited layer tree. The second web page can be a web page that is identified or selected by a user (e.g., via a web page fill-in field on the first web page, as a URL or query string attribute of the first web page request, etc.). The composited layer tree represents the second web page (e.g., with layers containing graphical representations of portions of the second web page). In some embodiments, the composited layer tree is created by a server environment that creates a DOM representing the second web page (e.g., an original DOM) and then creates the composited layer tree from the DOM. The simplified DOM represents the composited layer tree (e.g., with DOM nodes of the simplified DOM corresponding to layers of the composited layer tree). In some embodiments, creating the simplified DOM comprises creating one or more DOM nodes corresponding to one or more layers of the composited layer tree and setting properties for the one or more DOM nodes based on properties of the one or more layers of the composited layer tree. Instead of receiving composited layers, the representation of the second web page can be received (and a simplified DOM created) from layers at another level of processing, which can be referred to as a processed layer tree (e.g., comprising render layers and/or layers at another level of processing).

At 1840, the second web page is provided for display using the simplified DOM. For example, the simplified DOM can be provided to the web browser application for displaying the web page.

In some embodiments, other components can perform the operations discussed above with regard to the JavaScript code. For example, operations including receiving a processed layer tree and creating a simplified DOM from the processed layer tree can be performed by a custom web browser application (e.g., a web browser application with custom code), by a web browser plug-in, by a web browser extension component, and/or by another component that works independently or together with the web browser application.

In some embodiments, the JavaScript code (or another component) can perform other functions. For example, the JavaScript code can obtain bookmarks or browsing history (e.g., associated with a user account) from a server environment and provide it for display.

Figure 19:
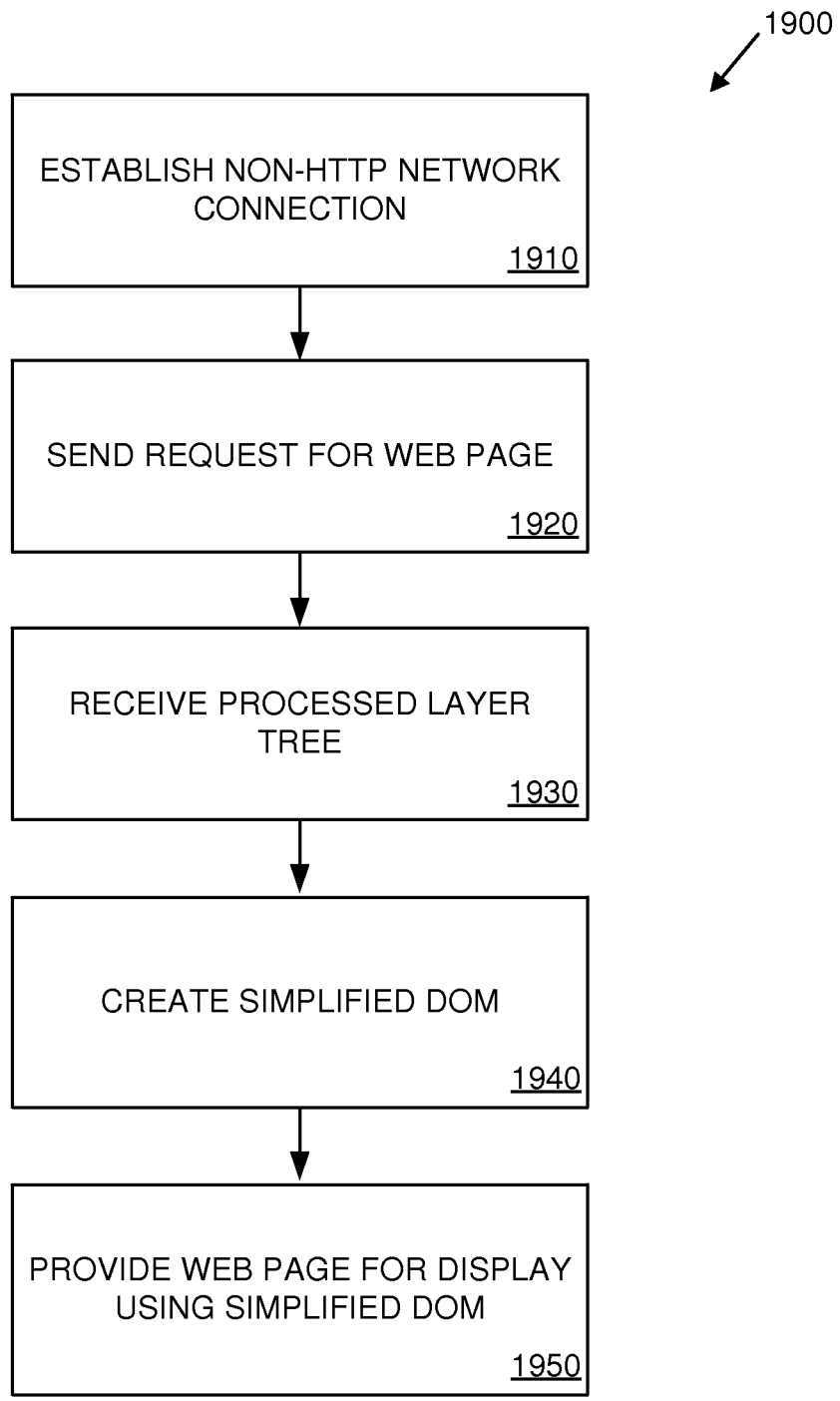

FIG. 19 is a flow chart of an example method 1900 for providing a browser as a service using a web browser component. For example, the example method 1900 can be performed by the client computing device 102 described above with regard to FIG. 12 or the client device 1320 described above with regard to FIG. 13. The web browser component can be a web browser plug-in, a web browser extension component, custom web browser code, JavaScript code, and/or another type of component configured to provide a browser as a service. In some embodiments, the user downloads and installs the component (e.g., downloads the plug-in or extension) providing the browser as a service.

At 1910, a non-HTTP network connection is established with a server environment (e.g., with a headless browser). For example, a headless browser can perform web browsing operations in place of a client device (e.g., assuming the client device's capabilities) including obtaining web pages and associated web page resources. The headless browser can create an original DOM from the web page and associated resources and create processed layers from the original DOM for sending to the client device.

At 1920, a request is sent for a web page using the non-HTTP network connection. For example, the request can be sent in response to a user entering a web page URL, selecting a link on a web page, etc. In some embodiments, the user accesses a landing web page where the user indicates (e.g., via a form field) the web page the user wants to access.

At 1930, a processed layer tree is received using the non-HTTP network connection. The processed layer tree represents the web page (e.g., with layers containing graphical representations of portions of the web page). In some embodiments, the processed layer tree is created by a server environment (e.g., a headless browser) that creates a DOM representing the web page (e.g., an original DOM) and then creates the processed layer tree from the DOM. The processed layer tree can comprise render layers, composited layers, and/or layers at another level of processing. The processed layer tree can be received over the non-HTTP network connection in an encoded format (e.g., a custom binary format) and decoded by the client device.

At 1940, a simplified DOM is created. The simplified DOM represents the processed layer tree (e.g., with DOM nodes of the simplified DOM corresponding to layers of the processed layer tree). In some embodiments, creating the simplified DOM comprises creating one or more DOM nodes corresponding to one or more layers of the processed layer tree and setting properties for the one or more DOM nodes based on properties of the one or more layers of the processed layer tree.

At 1950, the web page is provided for display using the simplified DOM. For example, the simplified DOM can be provided to the web browser application for displaying the web page.

Figure 20:
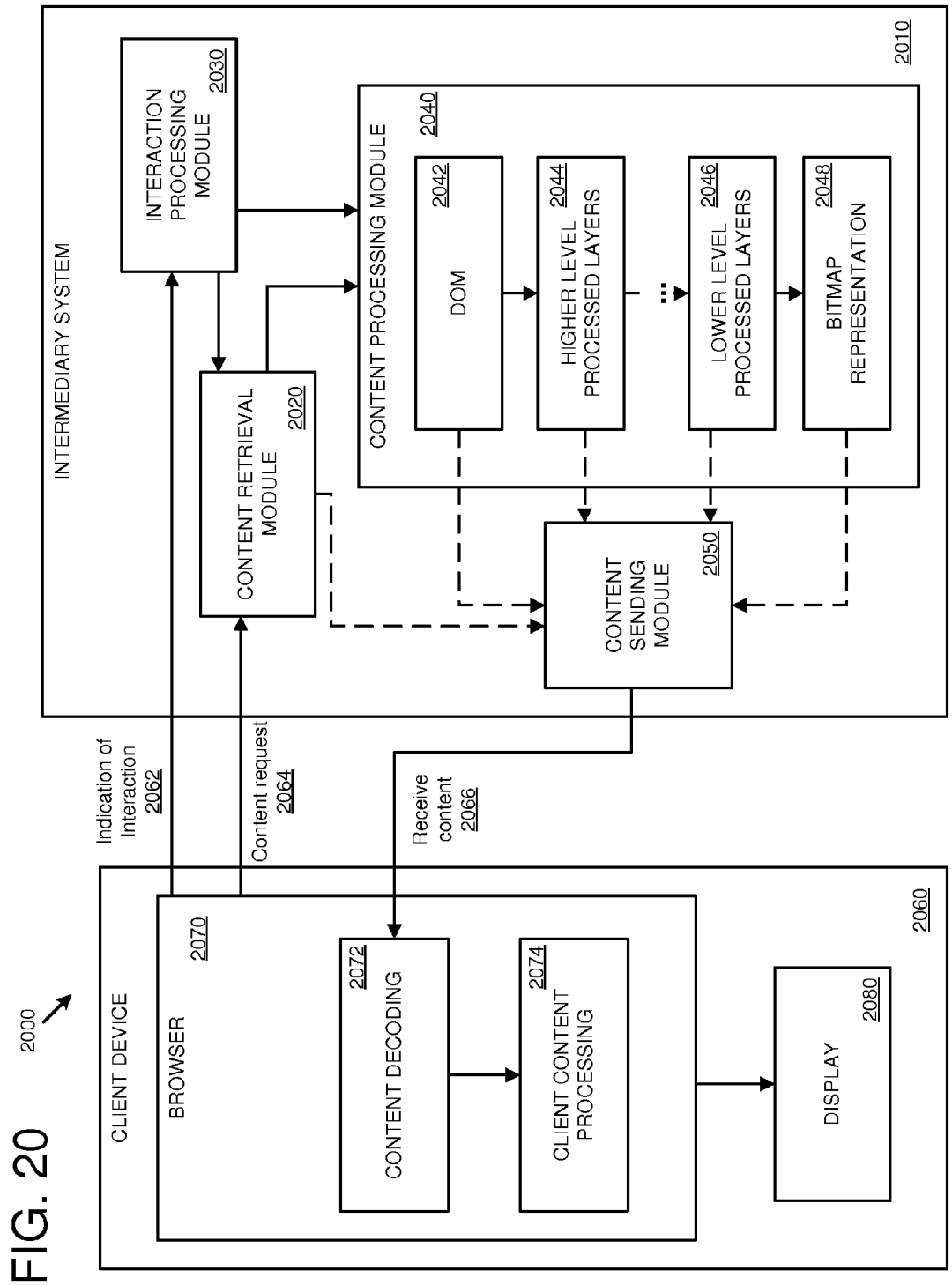
FIG. 20 is a block diagram depicting an example environment for web browsing using an intermediary system.

FIG. 20 is a block diagram depicting an example environment 2000 in which content consumption activity (e.g., web browsing) is performed by a client device 2060 in communication with an intermediary system 2010. For example, the intermediary system 2010 can be a headless browser system that performs web browsing operations independently, or in combination with, the client device 2060. In some implementations, the intermediary system 2010 performs some or all of the functions described above with regards to the network computing and storage provider 107.

The activity shown in FIG. 20 will be discussed with respect to a request for, processing of, and interaction with a content page, such as a web page. Illustratively, the content page may be any content page hosted or offered by a content source, such as a web site. The content page may be defined, at least partially, by a base resource such as an HTML file. The base resource does not need to be a pre-existing file, but may instead be a dynamically generated stream of markup language, metadata, or other content. The base resource may reference one or more embedded resources, such as images, videos, script files, executable objects, and the like. For example, if the base resource is an HTML file, it may include tags referencing various resources including location identifiers where the resources may be obtained (e.g., local identifiers and/or external identifiers such as addresses of servers where the resources may be obtained).

As illustrated, the browser 2070 of the user device 2060 can send a request for content (as indicated at 2064) to the content retrieval module 2020 of the intermediary system 2010. The request for content can be, for example, a request for a web page generated when the user selects a user-selectable option directing the browser 2070 to the web page URL. The request for content may be a standardized request, such as an HTML GET request that requests a resource at a particular location. In some embodiments, the request for content may be a request for layers (e.g., for processed layers). In some embodiments, the request for content can be accompanied by data representing capabilities of client device 2060, for example one or more of processing capabilities, network connection parameters, and configuration of browser 2070, to name a few.

In some embodiments, when intermediary system 2010 receives the request for a content page, the intermediary system 2010 can assess, for the content page, whether sending the content for the page as processed layers (e.g., at one or more levels of processing) to the client device 2060 will reduce a user-perceived page load time relative to at least one alternative rendering technique. In some cases, the intermediary system 2010 can determine whether a layer transfer rendering technique, in which processed layers are sent, is preferable for a given page load based on a number of factors, for example the speed, bandwidth, and type of network connection of client device 2060 as well as characteristics of the content site. For example, intermediary system 2010 can determine or predict whether the layer transfer rendering technique will reduce a page load time and/or bandwidth consumption compared to fully rendering the content page on the browser 2070 (e.g., sending original HTML and associated web resources and having the browser 2070 perform all of the rendering pipeline operations) or fully rendering the content page on the intermediary system 2010 (e.g., performing all of the rendering pipeline operations and sending a bitmap representation to the client device 2060).

The content retrieval module 2020 can retrieve the content of the content page, for example HTML and associated resources, from content sources (e.g., web servers or content servers) and/or from local storage (e.g., cache). In some implementations, the network connection between the content retrieval module 2020 and the content sources may be faster than the network connection between the client device 2060 and the content sources, thereby reducing latency in rendering the content page for the user. The content source may be the origin content server, a CDN server, a proxy server, or some other source.

The content processing module 2040 (e.g., implementing all or part of a rendering pipeline) can receive content (e.g., web page content) from the content retrieval module 2020. The content processing module 2040 can construct a DOM from of the received content, as indicated at 2042. For example, the DOM can be constructed by converting HTML elements and any embedded resources into DOM nodes based on a DOM definition or specification. Creating the DOM can also involve parsing any available style data, such as style data obtained from a referenced CSS file or style data included in the HTML file.

Based on the DOM, different levels of processed layers can be generated, which can include higher level processed layers 2044, lower level processed layers 2046 and any processed layers in-between. While two levels of processed layers are depicted (2044 and 2046), different implementations can have more or fewer levels of processed layers. Different layers of a content page can encompass different two-dimensional areas of the content page (for example, cover different ranges of coordinates without overlapping). In some cases, one layer may partially or completely overlap another layer (for example, a background layer may be partially overlapped by any number of other layers, each of which may partially or completely overlap other layers, etc.). The content processing module 2040 can also create a bitmap representation of the content (e.g., the web page) using the processed layers, as depicted at 2048. Depending on the specific configuration being used, the content processing module 2040 can create information for one or more of the levels of processing (e.g., 2042, 2044, 2046, and/or 2048). For example, the content processing module 2040 may process the content to create a DOM (as depicted at 2042) and a higher level processed layer (as depicted at 2044) without any additional processing (e.g., without proceeding to lower level processed layers or bitmaps, as depicted at 2046 and 2048).

The intermediary system 2010 supports sending content to the client device 2060 at different levels of processing. For example, the content sending module 2050 can receive raw content (e.g., original HTML content and associated resources) form the content retrieval module 2020. The content sending module 2050 can receive DOM information from the content processing module 2040. The content sending module 2050 can receive different levels of processed layers from the content processing module 2040. The content sending module 2050 can receive bitmap images from the content processing module 2040. These different sources of content are indicated by the dashed lines within the intermediary system 2010. Depending on the specific configuration being used, the content sending module 2050 may receive content from one or more levels of processing (e.g., the content sending module 2050 may only receive lower level processed layers for sending to the client device 2060).

The content sending module 2050 can encode the received content for sending to the client device 2060. For example, the content sending module 2050 can encode layers using a variety of layer encoding techniques and can examine the content of an individual layer to determine which encoding technique to use (e.g., to minimize bandwidth or page load time, for compatibility with a particular client device, etc.).

When the client device 2060 receives the content from the content sending module 2050 (as indicated at 2066), the browser 2070 decodes the content, as indicated at 2072. Decoding the content can involve performing one or more decoding techniques corresponding to the encoding techniques used to encode the content.

The browser 2070 can perform client content processing, as depicted at 2074. For example, the browser 2070 can perform processing operations similar to, or the same as, those performed by the content processing module 2040. The type of processing performed by the browser 2070 can depend on the level of processing performed by the intermediary system 2010. For example, if the content processing module 2040 created a DOM and then a higher level processed layer (e.g., a render layer tree) and sent the higher level processed layer to the client device 2060, then the browser 2070 could complete the processing by creating lower level processed layers (e.g., a graphics layer tree and a composited layer tree) and bitmaps for display, as depicted at 2080 (e.g., in cooperation with a GPU of the client device 2060, not depicted).

In some embodiments, the browser 2070 performs content processing, as depicted at 2074, to create decoded layers that can be provided to a layer compositor (not depicted) for generating instructions for display to display (as depicted at 2080) a visual representation of the content page based on the layers. For example, a layer tree can be constructed so that the layers will be decoded and provided to the layer compositor in an order in which the layers should be rendered. For example, the layer compositor can assemble the decoded layers in the proper positioning and in the proper order (e.g., with a background layer behind other layers, foreground layers covering background layers with overlapping coordinates, and with an interactivity layer in front of the layers). The layer compositor can use the assembled layers to generate instructions to configure to display a visual representation of the content page.

The browser 2060 can also detect user interaction with elements of the displayed content (e.g., user-selectable user-interface elements such as buttons and menus, scrolling, zooming, etc.) and send indications of user interaction to the interaction processing module 2030, as indicated at 2062. The browser 2070 can also be configured to perform local rendering updates in some embodiments. As discussed above, a layer can be generated corresponding to a scrollable portion of the content page. Accordingly, the browser 2070 can use the scrollable layer data to locally handle scrolling through the layer by updating the portion of the scrollable layer content that is displayed in the viewport, or boundary, of the scrollable layer. The browser 2070 can also detect changing graphical content, for example in a GIF or video, and send a request for updated content to the intermediary system 2010 if needed. In some embodiments the browser 2070 may have received a URL corresponding to video content from the intermediary system 2010, and accordingly may be able to handle the update to the portion of the content page including the video without sending a request to the intermediary system 2010.

For any interactions that are not able to be handled locally by the browser 2070 using the received content, the browser 2070 can send the indications of user interaction, as depicted at 2062, to the interaction processing module 2030. The interaction processing module 2030 can determine whether any updates to the visual representation of the content page are necessitated by the user interaction with the elements of the content. For example, the interaction processing module 2030 can communicate with the content retrieval module 2020 to obtain new or update content. The interaction processing module 2030 can also communicate with the content processing module 2040 to perform processing of content (e.g., an update to the DOM, an update to one or more processing layers, etc.) for sending back to the client device 2060 in response to the interaction.

In some embodiments, the example environment 2000 supports a cloud browse environment. For example, the intermediary system 2010 can obtain HTML and associated web page resources for a web page requested by the client device 2060 (e.g., via the content retrieval module 2020). The intermediary system 2010 can create a DOM (e.g., an original DOM) from the HTML and associated web page resources. The intermediary system 2010 can create processed layers (e.g., composited layers and/or layers at another level of processing) from the DOM and provide the processed layers to the client device 2060. The client device 2060 can create a simplified DOM from the processed layers and display the web page using the simplified DOM.

In some embodiments, the example environment 2000 supports a browser as a service. For example, the browser 2070 of the client device 2060 can include a component providing the browser as a service (e.g., a web browser plug-in, a browser extension component, custom browser code, JavaScript code from a loaded web page, etc.). The browser as a service component can receive processed layers (e.g., as a processed layer tree) for a requested web page, create a simplified DOM from the processed layers, and/or display the requested web page.

Figure 21:
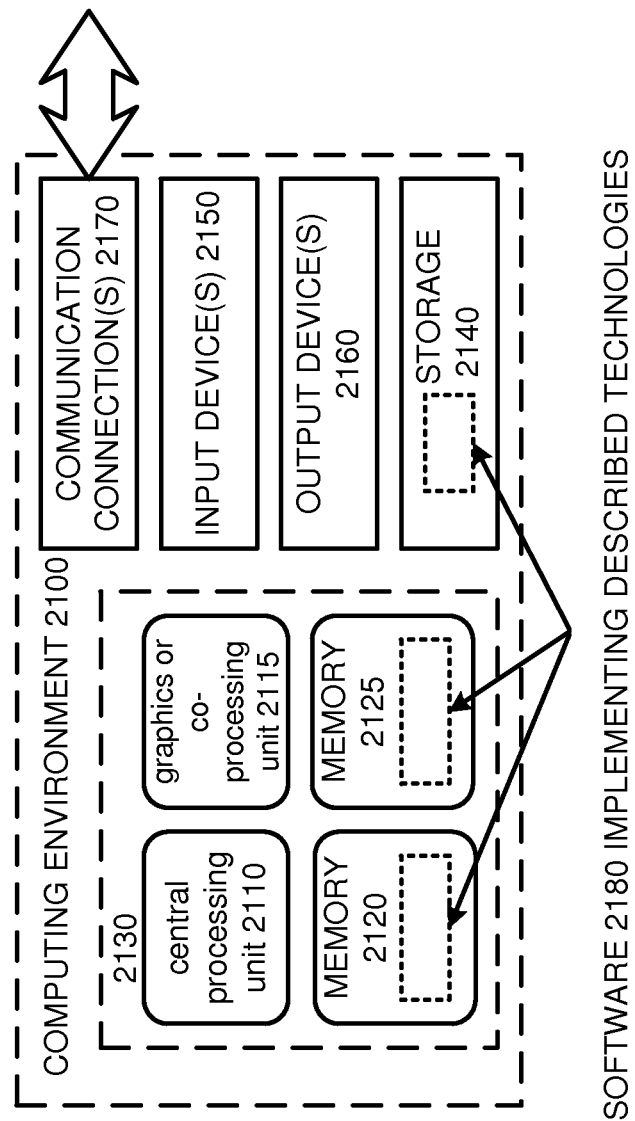
FIG. 21 depicts a generalized example of a suitable computing environment in which the described innovations may be implemented.

FIG. 21 depicts a generalized example of a suitable computing environment 2100 in which the described innovations may be implemented. The computing environment 2100 is not intended to suggest any limitation as to scope of use or functionality, as the innovations may be implemented in diverse general-purpose or special-purpose computing systems. For example, the computing environment 2100 can be any of a variety of computing devices (e.g., desktop computer, laptop computer, server computer, tablet computer, etc.)

With reference to FIG. 21, the computing environment 2100 includes one or more processing units 2110, 2115 and memory 2120, 2125. In FIG. 21, this basic configuration 2130 is included within a dashed line. The processing units 2110, 2115 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 21 shows a central processing unit 2110 as well as a graphics processing unit or co-processing unit 2115. The tangible memory 2120, 2125 may be volatile memory (e.g., registers, cache, RAM), non-volatile memory (e.g., ROM, EEPROM, flash memory, etc.), or some combination of the two, accessible by the processing unit(s). The memory 2120, 2125 stores software 2180 implementing one or more innovations described herein, in the form of computer-executable instructions suitable for execution by the processing unit(s).

A computing system may have additional features. For example, the computing environment 2100 includes storage 2140, one or more input devices 2150, one or more output devices 2160, and one or more communication connections 2170. An interconnection mechanism (not shown) such as a bus, controller, or network interconnects the components of the computing environment 2100. Typically, operating system software (not shown) provides an operating environment for other software executing in the computing environment 2100, and coordinates activities of the components of the computing environment 2100.

The tangible storage 2140 may be removable or non-removable, and includes magnetic disks, magnetic tapes or cassettes, CD-ROMs, DVDs, or any other medium which can be used to store information in a non-transitory way and which can be accessed within the computing environment 2100. The storage 2140 stores instructions for the software 2180 implementing one or more innovations described herein.

The input device(s) 2150 may be a touch input device such as a touch display or touchpad, a keyboard, a mouse, a pen, a voice input device, a scanning device, or another device that provides input to the computing environment 2100. The output device(s) 2160 may be a display, printer, speaker, CD-writer, or another device that provides output from the computing environment 2100.

The communication connection(s) 2170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

While illustrative embodiments have been disclosed and discussed, one skilled in the relevant art will appreciate that additional or alternative embodiments may be implemented within the spirit and scope of the present invention. For example, the techniques described herein may be utilized, without departing from the scope of the present invention, to allow remote processing management in any number of other software applications and processes, including, but not limited to, image or video editing software, database software, office productivity software, 3d design software, audio and sound processing applications, etc. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include signals and carrier waves, and does not include communication connections. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. Therefore, what is claimed as the invention is all that comes within the scope of these claims.

What is claimed is:

1. A method, implemented by a client computing device, for providing a browser as a service, the method comprising:
  sending, by the client computing device, a request for a first web page;

in response to the request, receiving, by the client computing device from a network computing provider, the first web page, wherein the first web page comprises JavaScript code;
providing a uniform resource locator (URL) identifying a second web page to the network computing provider;
running, by the client computing device, the JavaScript code within a web browser to perform operations comprising:
receiving a composited layer tree representing the second web page, wherein the composited layer tree is created by the network computing provider from an original Document Object Model (DOM) for the second web page; and
creating a simplified Document Object Model (DOM) from the composited layer tree; and
displaying, by the client computing device, the second web page using the simplified DOM.

2. The method of claim 1 wherein running the JavaScript code within the web browser further performs operations comprising:
receiving, from the network computing provider, bookmarks associated with a user of the client computing device; and
providing the bookmarks for display.

3. The method of claim 1 wherein the simplified DOM comprises one or more image-type DOM nodes, each of the one or more image-type DOM nodes comprising:
image content in an image format, wherein the image content is a graphical representation of at least a portion of the second web page; and
properties for the image content comprising Cascading Style Sheet (CSS) properties.

4. The method of claim 1 further comprising:
determining capabilities of the client computing device; and
sending the determined capabilities to the network computing provider, wherein the composited layer tree is compatible with the determined capabilities.

5. The method of claim 1 wherein running the JavaScript code within the web browser further performs operations comprising:
sending, to the network computing provider, an indication of custom image format support that is not natively supported by the client computing device;
wherein the composited layer tree comprises layer content in an image format according to the indication of custom image format support, comprising:
when the client computing device supports the custom image format, the layer content is in the custom image format; and
when the client computing device does not support the custom image format, the layer content is in a natively-supported image format different from the custom image format.

6. The method of claim 1 wherein the composited layer tree is created by the network computing provider by performing rendering pipeline operations to flatten the original DOM into a fewer number of composited layers than a number of DOM elements in the original DOM.

7. A computing device comprising:
one or more processing units; and
one or more network interfaces;
the computing device running a web browser comprising a component configured for performing operations providing a browser as a service, the operations comprising:
establishing a non-Hypertext Transfer Protocol (non-HTTP) network connection with a server environment,
sending, via the non-HTTP network connection, a request for a web page;
in response to the request, receiving, via the non-HTTP network connection, a processed layer tree, the processed layer tree representing the web page, wherein the processed layer tree is created by the server environment from an original Document Object Model (DOM) for the web page;
creating a simplified Document Object Model (DOM) representing the processed layer tree; and
providing the web page for display using the simplified DOM.

8. The computing device of claim 7 wherein the component that provides the browser as a service is a web browser plug-in component of the web browser.

9. The computing device of claim 7 wherein the component that provides the browser as a service is custom code of the web browser.

10. The computing device of claim 7 wherein the component that provides the browser as a service is a JavaScript component loaded from a different web page.

11. The computing device of claim 7 wherein the simplified DOM comprises one or more image-type DOM nodes, each of the one or more image-type DOM nodes comprising:
image content in an image format, wherein the image content is a graphical representation of at least a portion of the web page; and
properties for the image content.

12. The computing device of claim 11 wherein the image format is a custom image format.

13. The computing device of claim 7 wherein creating the simplified DOM representing the processed layer tree comprises:
for each of one or more layers of the processed layer tree:
creating a DOM node for the processed layer;
obtaining properties for the processed layer; and
setting properties for the DOM node based on the properties for the processed layer, wherein the properties for the DOM node comprise Cascading Style Sheet (CSS) properties.

14. The computing device of claim 7, the operations further comprising:
sending an indication of custom image format support;
wherein the processed layer tree comprises layer content in an image format according to the indication of custom image format support.

15. The computing device of claim 7 wherein the processed layer tree is created by the server environment by performing rendering pipeline operations to flatten the original DOM into a fewer number of processed layers than a number of DOM elements in the original DOM.

16. A computer-readable storage medium storing computer-executable instructions for causing a computing device to perform operations providing a browser as a service, the operations comprising:
obtaining a web browser plug-in providing a browser as a service, wherein the browser as a service accesses a server environment for performing web browser operations;
sending a request for a web page;
in response to the request, receiving a processed layer tree, the processed layer tree representing the web page, wherein the processed layer tree is created by the server environment from an original Document Object Model (DOM) for the web page;

creating, by the web browser plug-in, a simplified Document Object Model (DOM) representing the processed layer tree comprising; and providing the web page for display using the simplified DOM.

17. The computer-readable storage medium of claim 16 wherein the simplified DOM comprises one or more image-type DOM nodes, each of the one or more image-type DOM nodes comprising:

image content in an image format, wherein the image content is a graphical representation of at least a portion of the web page; and properties for the image content comprising Cascading Style Sheet (CSS) properties.

18. The computer-readable storage medium of claim 16 wherein the image format is a custom image format.

19. The computer-readable storage medium of claim 16 wherein creating the simplified DOM representing the processed layer tree comprises:

for each of one or more layers of the processed layer tree:
creating a DOM node for the processed layer;
obtaining properties for the processed layer; and
setting properties for the DOM node based on the properties for the processed layer.

20. The computer-readable storage medium of claim 16 wherein the processed layer tree is created by the server environment by performing rendering pipeline operations to flatten the original DOM into a fewer number of processed layers than a number of DOM elements in the original DOM.

* * * * *